(12) United States Patent
Yamaoka et al.

(10) Patent No.: US 10,073,655 B2
(45) Date of Patent: Sep. 11, 2018

(54) SEMICONDUCTOR INTEGRATED CIRCUIT APPARATUS

(71) Applicant: HITACHI, LTD., Chiyoda-ku, Tokyo (JP)

(72) Inventors: Masanao Yamaoka, Tokyo (JP); Chihiro Yoshimura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 33 days.

(21) Appl. No.: 15/504,127

(22) PCT Filed: Sep. 3, 2014

(86) PCT No.: PCT/JP2014/073226
§ 371 (c)(1),
(2) Date: Feb. 15, 2017

(87) PCT Pub. No.: WO2016/035171
PCT Pub. Date: Mar. 10, 2016

(65) Prior Publication Data
US 2017/0262226 A1     Sep. 14, 2017

(51) Int. Cl.
*G06F 3/06* (2006.01)
*G06N 7/00* (2006.01)
*G06N 99/00* (2010.01)

(52) U.S. Cl.
CPC .......... *G06F 3/0655* (2013.01); *G06F 3/0604* (2013.01); *G06F 3/0673* (2013.01); *G06N 7/005* (2013.01); *G06N 99/002* (2013.01)

(58) Field of Classification Search
None
See application file for complete search history.

(56) References Cited

U.S. PATENT DOCUMENTS 5,565,695 A * 10/1996 Johnson ................. G11C 11/16
257/295
7,808,026 B2 * 10/2010 Shiraiwa ................ B82Y 10/00
257/213
(Continued)

FOREIGN PATENT DOCUMENTS

WO    WO 2012/118064 A1    9/2012

OTHER PUBLICATIONS

Stan Gibilisco, "Shift Register", Aug. 30, 2012, pp. 1 - 12, https://web.archive.org/web/20120830110810/https://whatis.techtarget.com/definition/shift-register (Year: 2012).*
(Continued)

*Primary Examiner* — Christopher D Birkhimer
(74) *Attorney, Agent, or Firm* — Miles & Stockbridge P.C.

(57) ABSTRACT

A semiconductor integrated circuit apparatus 23 is used for obtaining an optimum solution using an Ising model, and the semiconductor integrated circuit apparatus 23 includes plural spin cells 1 that are connected with each other. Here, each spin cell 1 includes: a memory cell 9(N) for memorizing a spin value; a computing circuit 10 for computing interactions among the plural spin cells that are connected with each other; a memory circuit 4 for holding at least one-bit data; and an inversion logic circuit LG capable of modifying a computed result obtained by the computing circuit in accordance with data held by the memory circuit 4. The computed result modified by a modification circuit in accordance with the data held by the memory circuit is memorized in the memory cell 9(N) included in each spin cell 1.

14 Claims, 12 Drawing Sheets

(56) References Cited

U.S. PATENT DOCUMENTS

| | | | | |
|---|---|---|---|---|
| 7,825,445 B2* | 11/2010 | Covington | ......... | G11C 11/1659 257/2 |
| 8,358,149 B2* | 1/2013 | Katti | ..................... | H03K 19/16 326/38 |
| 8,358,154 B2* | 1/2013 | Katti | ..................... | G11C 11/161 326/112 |
| 8,427,199 B2* | 4/2013 | Katti | ..................... | H03K 19/168 326/104 |
| 8,576,601 B2* | 11/2013 | Marukame | ............ | G11C 15/02 365/50 |
| 8,580,583 B2* | 11/2013 | Lee | ........................ | B82Y 25/00 257/421 |
| 8,625,335 B2* | 1/2014 | Morise | ............... | G11C 19/0841 365/157 |
| 8,681,539 B2* | 3/2014 | Zheng | .................... | B82Y 10/00 365/158 |
| 8,698,218 B2* | 4/2014 | Covington | ......... | G11C 11/1659 257/2 |
| 8,912,821 B2* | 12/2014 | Friedman | ............ | H01L 27/1021 326/101 |
| 9,411,026 B2 | 8/2016 | Yamamoto et al. | | |
| 2006/0054985 A1* | 3/2006 | Mattis | ..................... | B82Y 10/00 257/428 |
| 2006/0138397 A1* | 6/2006 | Mattis | .................... | H01L 39/146 257/15 |
| 2009/0141541 A1* | 6/2009 | Covington | .......... | G11C 11/1659 365/158 |
| 2011/0026316 A1* | 2/2011 | Covington | .......... | G11C 11/1659 365/158 |
| 2012/0105101 A1* | 5/2012 | Katti | ..................... | H03K 19/16 326/38 |
| 2012/0105102 A1* | 5/2012 | Katti | ..................... | H03K 19/16 326/38 |
| 2012/0105103 A1* | 5/2012 | Katti | ..................... | H03K 19/16 326/38 |
| 2013/0063178 A1* | 3/2013 | Friedman | ............ | H01L 27/1021 326/41 |
| 2014/0015077 A1* | 1/2014 | Lee | ........................ | H01L 43/02 257/421 |

OTHER PUBLICATIONS

Wrighton, Michael G. et al.; "Hardware-Assisted Simulated Annealing with Application for Fast FPGA Placement, FPGA '03 Proceedings of the 2003 ACM/SIGDA Eleventh International Symposium on Field Programmable Gate Arrays"; pp. 33-42.

* cited by examiner (A)

(B)

SEMICONDUCTOR INTEGRATED CIRCUIT APPARATUS

TECHNICAL FIELD

The present invention relates to semiconductor integrated circuit apparatuses used for obtaining a solution using Ising models, and in particular, relates to a semiconductor integrated circuit apparatus that includes a memory and mimics spins in an Ising model using the memory.

BACKGROUND ART

An Ising model is a statistical mechanics model for explaining the behavior of a magnetic material. An Ising model is defined by plural spins each of which has a binary value, that is, +1 or −1, interaction coefficients between spins, and external magnetic field coefficients each of which belongs to each spin. Using an Ising model, energy corresponding to the Ising model can be calculated from a given spin array, given interaction coefficients, and given external magnetic field coefficients. The search of the ground state of an Ising model corresponds to an optimization problem to obtain a spin array that makes the energy function of the Ising model minimum. Here, it is known that the search for the ground state of an Ising model the topology of which is a nonplanar graph is an NP-hard problem.

The search of the ground state of an Ising model also corresponds to a maximum cut problem that is known as an NP-hard graph problem. Such a graph problem can be used for wide applications such as the detection of a community in a social network and the segmentation in image processing. Therefore, if there is an electronics apparatus capable of executing the search of the ground state of an Ising model, the apparatus can be applied to various problems.

Patent Literature 1 discloses a quantum calculation apparatus of an Ising model and a quantum calculation method of the Ising model. In addition, Nonpatent Literature 1 discloses a semiconductor apparatus that executes simulated Annealing.

CITATION LIST

Patent Literature

Patent Literature 1: WO 2012/118064
Nonpatent Literature 1: Michael G. Wrighton, Andre M. DeHon, Hardware-Assisted Simulated Annealing with Application for Fast FPGA Placement, FPGA '03 Proceedings of the 2003 ACM/SIGDA eleventh international symposium on Field programmable gate arrays, Pages 33-42

SUMMARY OF INVENTION

Technical Problem

Meanwhile, because an Ising model includes a large number of spins, the number of combinations of states in which the spins can exist becomes vast. Therefore, it is practically impossible to obtain ground states by executing searches about all the combinations. Hence, it is necessary to narrow down the number of combinations of spins about which searches are executed in order to efficiently search for ground states. However, there may be a possibility that only approximate ground states are obtained because local optimum solutions are selected owing to the narrowing-down of the number of combinations of spins. Therefore, a method in which a better solution can be obtained by discarding local solutions obtained in the processing of search is needed.

As one of such methods, Patent Literature 1 proposes a method in which the search of ground state is executed by leveraging the quantum fluctuations by means of superconductive elements. Furthermore, there is also a method in which a better solution can be obtained using a heuristic method that allows the temporary degradation of solutions as simulated annealing does. In the case of using this method, it becomes possible to speedily execute the search of the ground state by means of hardware as disclosed in Nonpatent Literature 1.

However, in the method disclosed in Patent Literature 1 in which it becomes possible to escape from a local solution by leveraging the quantum fluctuations of superconductive elements, it is required to use a sophisticated cooling system to realize a superconducting condition. Therefore, the total cost of the quantum calculation apparatus becomes high, and additionally there arises a problem in that such a large scale apparatus is difficult to fabricate.

In addition, as disclosed in Nonpatent Literature 1, in the case of utilizing a semiconductor apparatus in which simulated annealing is executed, it is necessary to provide necessary randomness using a pseudorandom number generator. In this case, if a pseudorandom number generator is mounted on each computing unit for executing the basic computing of annealing in order to secure the parallelism of the annealing operations, the circuit scale is increased, and there arises a problem of the high cost or difficulty of fabricating such a large scale apparatus.

One of the objects of the present invention is to provide a semiconductor integrated circuit apparatus for an Ising model capable of reducing the possibility of falling into a local solution while the circuit scale of the semiconductor integrated circuit apparatus is prevented from increasing.

The abovementioned object and other objects and new features of the present invention will be revealed in association with the description of the present invention and the accompanying drawings hereinafter.

Solution to Problem

The overview of the representative invention among inventions disclosed in this application is briefly described as follows.

To put it concretely, a semiconductor integrated circuit apparatus is used for obtaining a solution using an Ising model, and the semiconductor integrated circuit apparatus includes plural spin cells that are connected with each other. Here, each spin cell includes: a memory cell for memorizing a spin value; a computing circuit for computing interactions among plural spin cells that are connected with each other; a memory circuit for holding at least one-bit data; and a modification circuit capable of modifying a computed result obtained by the computing circuit in accordance with the data held by the memory circuit. The computed result modified by the modification circuit in accordance with the data held by the memory circuit is memorized in the memory cell included in each spin cell.

The computed result is modified in accordance with the data held by the memory circuit, and the memory cell memorizes the modified computed result. With this, it becomes avoidable for the computation to be stuck at a local optimum solution in the processing of obtaining a solution. Moreover, because the avoidance of the computation being stuck can be realized with the use of the memory circuit and the modification circuit, the increase of the circuit scale of the semiconductor integrated circuit apparatus can be suppressed.

In one embodiment of the present invention, a small scale inversion logic circuit, which inverts a computed result, is used as the modification circuit.

Advantageous Effects of Invention

An advantageous effect obtained by the representative invention among inventions disclosed in this application is briefly described as follows.

In other words, the advantageous effect is that the representative invention can provide a semiconductor integrated circuit apparatus for an Ising model capable of reducing the possibility of falling into a local solution while the scale of the circuit scale is prevented from increasing.

DESCRIPTION OF EMBODIMENTS

In the following description of embodiments, there are some cases where plural sections or plural embodiments are separately described for convenience as needed. Those sections or embodiments are not completely unrelated to each other, and one is a modified example, an application example, a detailed explanation, or a supplementary explanation of apart or the whole of others or the like unless otherwise clearly specified. In addition, in the following embodiments, in the case where the numbers and the like (including numbers, numerical values, amounts, and ranges) of elements are referred to, the number of the elements is not limited to a specific number and can be larger or smaller than the specific number unless otherwise clearly specified, clearly limited to a specific number in principle, or the like.

Furthermore, in the following embodiments, it is needless to mention that the constituent elements of the embodiments (also including the elemental steps and the like) are not necessarily indispensable unless otherwise clearly specified, considered to be clearly indispensable in principle, or the like. In the same manner, in the following embodiments, in the case where the shapes, positions, or the like of the constituent elements of the embodiments are referred to, it will be assumed that the shapes or the like of the constituent elements include shapes or the like effectively approximate or similar to the shapes or the like of the constituent elements unless otherwise clearly specified, clearly considered not to be so in principle, or the like. The same holds true for the abovementioned numbers and the like (including numbers, numerical values, amounts, and ranges).

Hereinafter, the embodiments of the present invention will be explained with reference to the accompanying drawings. In addition, in all the drawings used for explaining the embodiments, the same reference signs are given to the same materials in principle, and a repeated explanation thereof will be omitted. Furthermore, in the following embodiments, explanations about the same or similar parts will not be repeated in principle except for cases where the explanations are especially needed.

In plural embodiments described hereinafter, the computed results of the computing of interactions among spin cells are inverted in accordance with a specified rule. With this, in the computing of the energy of an Ising model, the computed result is prevented from being stuck, and an optimum solution for the problem to be solved can be obtained.

First Embodiment

Figure 1:
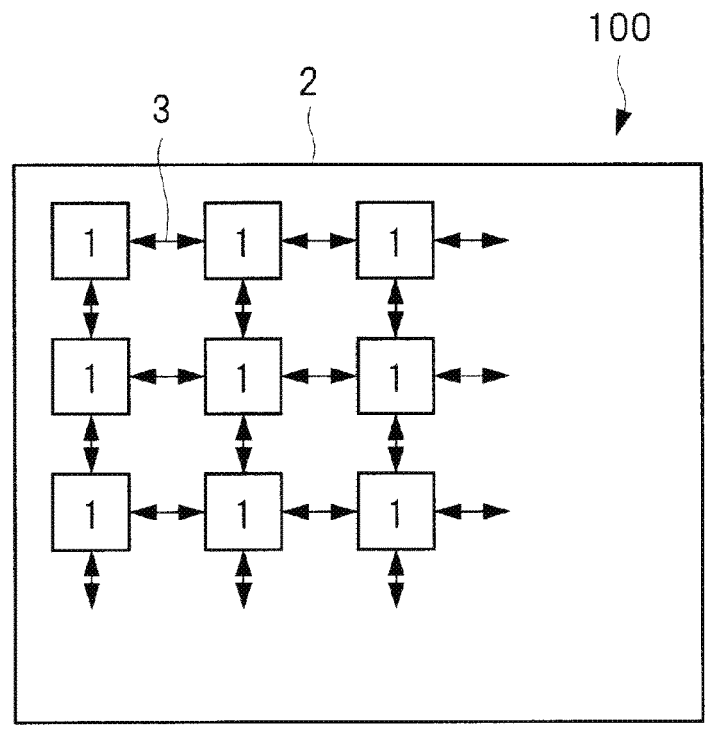
FIG. 1 is a conceptual diagram showing the configuration of an Ising calculator.

FIG. 1 is a conceptual diagram showing the configuration of an Ising calculator 100 that executes an Ising model calculation. The Ising calculator 100 executes the Ising model calculation using a semiconductor integrated circuit apparatus 2. In FIG. 1, the reference sign 1 denotes a spin cell that memorizes (stores) a spin value of the Ising model. The semiconductor integrated circuit apparatus 2, which is used for the calculation of the Ising model, includes plural spin cells 1 as shown in FIG. 1, and interactions are generated among the plural spin cells 1. FIG. 1 shows that an interaction is denoted by the reference sign 3, and FIG. 1 shows that interactions each of which is generated as a result of two spin cells 1 physically adjacent influencing each other. In this case, spin cells 1 physically adjacent to a certain spin cell 1 means four spin cells 1 which are disposed on the upside, downside, left side, and right side of the certain spin cell 1. It goes without saying that, in a case where a spin cell 1 is not disposed on any of the upside, downside, left side, and right side of a certain spin cell 1, or in the case where two spin cell 1 are not disposed on any two sides of the upside, downside, left side, and right side of the certain spin cell 1, the number of spin cells 1 adjacent to the certain spin cell 1 is 3 and 2 respectively.

In the computing of the energy of an Ising model, because plural spin cells 1 disposed in the semiconductor integrated circuit apparatus 2 repeat interactions 3 therebetween, a value possessed by each spin cell 1 varies, and the computing is executed in such a way that the energy, which is computed using the values of all the spin cells 1 and the coefficients of the interactions 3 in the Ising calculator 100, decreases. In the concrete computing of the energy E of the Ising model, not only the values of the spin cells 1 and the coefficients of the interactions 3, but also external magnetic field coefficients, which influence the spin cells 1, are taken into consideration. The energy E of the Ising model, in which the external magnetic field coefficients are taken into consideration, is given by Expression (1).

$$E = -\Sigma J_{ij}\sigma_i\sigma_j - \Sigma h_i\sigma_i \quad \text{Expression (1)}$$

In Expression (1), "$i$" and "$j$" denote the numbers of spin cells respectively, and "$\sigma_i$" and "$\sigma_j$" denote the states of the $i^{th}$ and the $j_{th}$ spin cells respectively (the value of the state: +1 or −1). Moreover, "$J_{ij}$" denotes an interaction coefficient between the $i^{th}$ spin cell and the $j^{th}$ spin cell, and $h_i$ is an external magnetic field coefficient for the $i^{th}$ spin cell.

Figure 2:
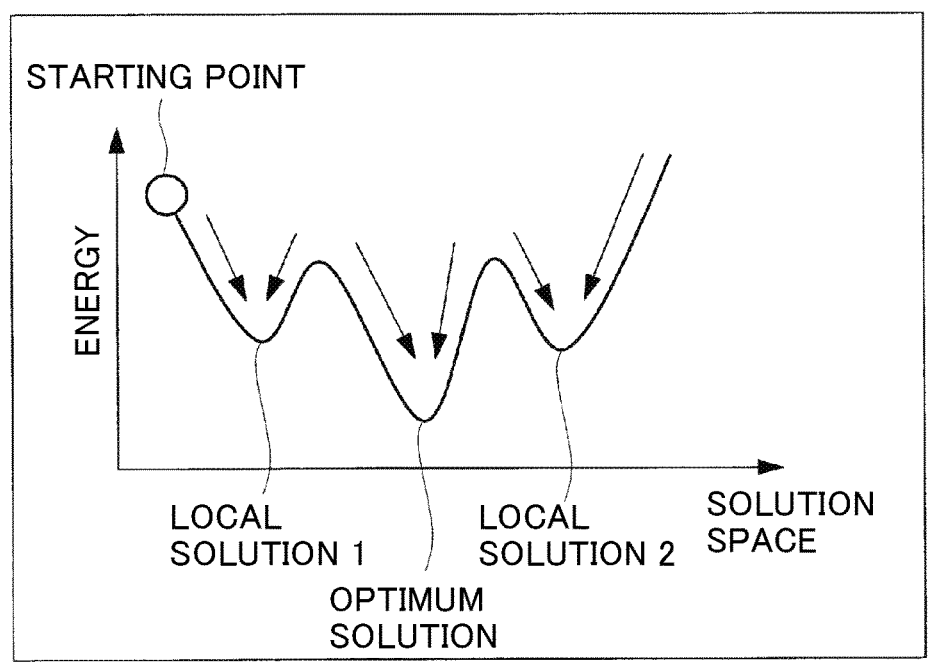
FIG. 2 is a schematic view showing the energy of an Ising model.

FIG. 2 is a schematic view that schematically shows the energy of the Ising model obtained by the computing. In FIG. 2, the solution space is represented by the horizontal axis, and the energy is represented by the vertical axis. The solution of the Ising model corresponds to the low state of the energy. Therefore, the computing of the energy of the Ising model is executed in such a way that the energy decreases. In other words, basically the energy changes in the directions shown by arrows in FIG. 2 so that the energy decreases owing to the interactions 3 shown in FIG. 1. It is required that the Ising calculator 100 should obtain the lowest state of the energy, which is depicted as an optimum solution in FIG. 2, as a solution. However, in the actual states of the energy, not only the optimum solution but also local solutions 1 and 2 exist as low states of the energy as shown in FIG. 2. In other words, the energies at the local solutions 1 and 2 are also in the states of the energy lower than the surrounding states of the energy. Therefore, if the computing executed on the basis of the interactions and the like reaches the state of a local solution in the Ising calculator 100, the computing is stuck at that state. For example, if the Ising calculator 100 starts the computing of the energy at the state shown by a starting point in FIG. 2, the energy decreases and the computing reaches the state of the local solution 1, and the computing is stuck at that state, so that the computing cannot reach the state of the optimum solution that is an actually required solution.

Figure 3:
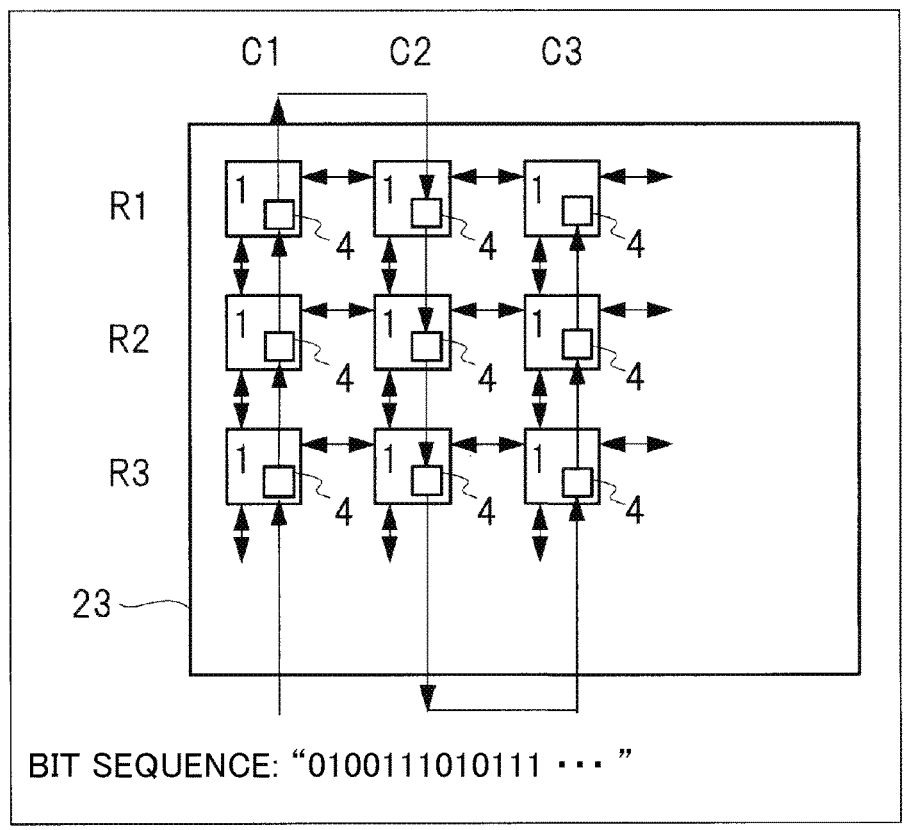
FIG. 3 is a schematic view showing the configuration of a semiconductor integrated circuit apparatus according to a first embodiment.

FIG. 3 is a schematic view showing the configuration of a semiconductor integrated circuit apparatus 23 according to the first embodiment. Because this semiconductor integrated circuit apparatus 23 is similar to the semiconductor integrated circuit apparatus 2 shown in FIG. 1, main different points will be explained hereinafter. In the semiconductor integrated circuit apparatus 23, a memory circuit 4 is added to each of plural spin cells 1. Furthermore in this embodiment, each of memory circuits 4 installed in spin cells 1 physically adjacent to each other stores at least 1 bit data, and the memory circuits 4 are connected with each other in series. For example, FIG. 3 shows spin cells 1 disposed in an M×N matrix form (where M rows are denoted by R1, R2, and R3, and N columns are denoted by C1, C2, and C3), and a memory circuit 4 is installed in each spin cell 1. For example, in a case where attention is paid to the column C1, memory circuits 4 in spin cells 1 disposed in the rows R3 and R2, which are physically adjacent to each other, are connected with each other in series, and memory circuits 4 in spin cells 1 disposed in the rows R2 and R1, which are physically adjacent to each other, are connected with each other I series. Similarly, a memory circuit 4 in a spin cell 1 at the intersection of the row R1 and the column C2, which is physically adjacent to the column C1, is connected with a memory circuit 4 in series at the intersection of the row R1 and the column C1. In a similar way, each of the remaining memory circuits 4 is connected with memory circuits 4 in adjacent spin cells 1. In the series connection of two memory circuits 4, the output of one memory circuit 4 is connected with the output of the other memory circuit 4. With this, memory circuits 4 installed respectively in plural spin cells form one shift register. To put it another way, in the first embodiment, it can safely be said that a shift resister is installed in the semiconductor integrated circuit apparatus 23 differently from the semiconductor integrated circuit apparatus 2 shown in FIG. 1.

Modifying data for modifying the state is input into the shift register. In the example shown in FIG. 3, a memory circuit 4 installed in a spin cell 1 disposed at the intersection of the row R3 and the column C1 is assumed to be an input stage of the shift register, and the modifying data is input into this memory circuit 4 (at the intersection of the row R3 and the column C1). The modifying data is input as a bit sequence, and is sequentially shifted through the shift register. In FIG. 3, a bit sequence, which is modifying data, is represented by "0100111010111 . . . ". Such a bit sequence, that is, a binary signal sequence sequentially propagates and circulates through the shift register. With this, a desired binary signal can be memorized in a memory circuit 4 in each spin cell 1.

Although the configuration of a spin cell 1 will be explained in detail afterward, if a binary signal memorized (stored) in a memory circuit 4 installed in a spin cell 1 is modifying data equal to a predefined logical value (for example a binary signal "1"), the result of interactions computed in the spin cell 1 is inverted and the inverted result is memorized in the spin cell 1 as the spin value of the spin cell. By inverting the result of the interactions and making the inverted result a spin value memorized in the spin cell 1, there arises a case where the state of the energy changes in a direction opposite to a direction shown by an arrow in FIG. 2, otherwise the state of the energy changes only in the direction shown by the arrow. With this, the state of the energy obtained by the computing is prevented from being stuck at the local solution 1 or the local solution 2, and the state of the energy can reach the state of the optimum solution.

The bit sequence formed by binary signals "1" and "0" held in the shift register formed by the plural memory circuits 4 has to be modified in accordance with the state of the energy. This is because, if the results of interaction computing are always inverted with a high probability, the energy does not move in a direction that decreases the energy. Therefore, it is necessary that a probability with which the results of the computing are inverted should be lowered with the elapse of time. In other words, as time, during which the computing of the energy is executed, passes, it becomes necessary that the ratio of the predefined logical value (the binary signal "1") that is used for inverting the computed results and included in the bit sequence that is modifying data should be decreased.

Figure 4:
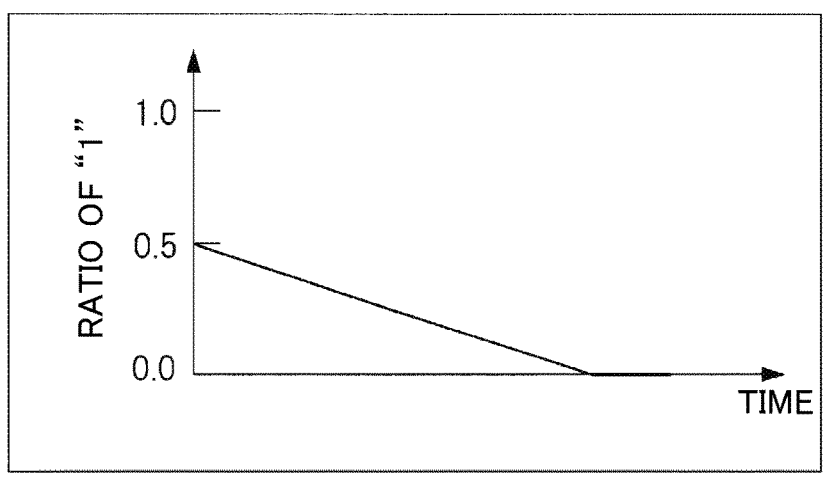
FIG. 4 is a diagram showing the occurrence ratio of a predefined logical value (a binary signal "1").

FIG. 4 is a diagram showing the occurrence ratio of the predefined logical value (the binary signal "1") that is used for inverting the computed results. FIG. 4 shows that the ratio of the predefined logical value ("1") is decreased from 0.5 to 0 with the elapse of time. Alternatively, it is conceivable that inverter circuits connected in series are used, for example, instead of the shift register formed by the memory circuits 4. In this case, however, it is difficult to make each of plural spin cells 1 memorize arbitrary modifying data.

<Adjustment of Occurrence Ratio of Predefined Logical Value in Modifying Data>

Figure 5:
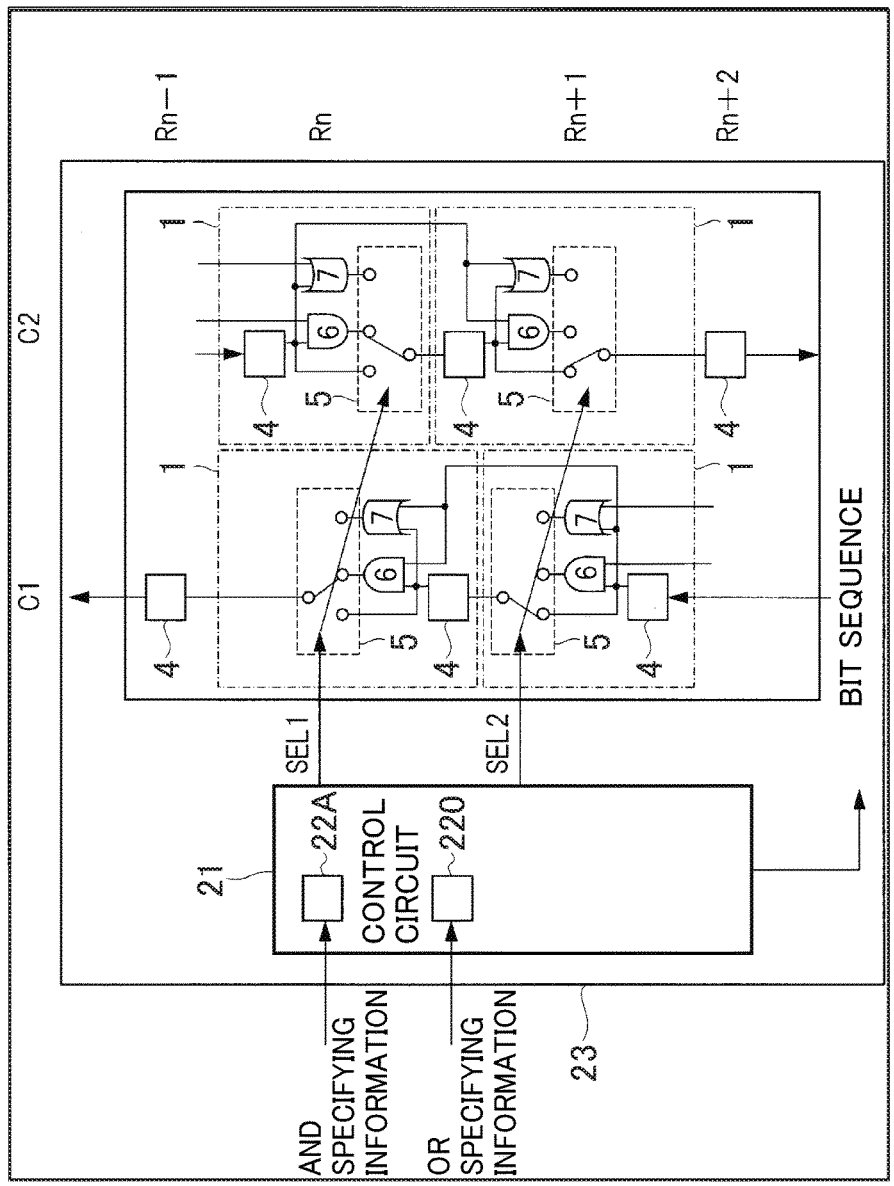
FIG. 5 is a block diagram showing the configuration of the semiconductor integrated circuit apparatus according to the first embodiment.

FIG. 5 is a block diagram showing the configuration of the semiconductor integrated circuit apparatus 23 according to the first embodiment. In FIG. 5, among components of the semiconductor integrated circuit apparatus 23 shown in FIG. 3, the shift register formed by memory circuits 4, and a control part for controlling the shift register is picked up and depicted. In other words, the part for controlling the occurrence ratio of the predefined logical value ("1") in the bit sequence, which is modifying data stored in the shift register formed by the plural memory circuits 4, is depicted in FIG. 5.

In FIG. 5, the reference sign 5 denotes a selection switch, the reference sign 6 denotes an AND circuit with two inputs that executes a logical product (AND) operation, and the reference sign 7 denotes an OR circuit with two inputs that executes a logical sum (OR) operation. In addition, in FIG. 5, the reference sign 21 denotes a control circuit that controls selection switches 5. The control circuit 21 includes a ratio register 22A that holds data showing a ratio to select the outputs of the AND circuits 6 (AND ratio data) and a ratio register 220 that holds data showing a ratio to select the outputs of the OR circuits 7 (OR ratio data). AND specifying information that specifies the AND ratio data and OR specifying information that specifies the OR ratio data are supplied to the ratio register 22A and the ratio register 220 respectively.

Although this will be explained with reference to FIG. 7 later, each spin cell 1 includes an AND circuit 6, an OR circuit 7, and a selection switch 5 that are all related to a memory circuit 4. In FIG. 5, a memory circuit 4, an AND circuit 6, an OR circuit 7, and a selection circuit 5 that are included in one spin cell 1 are surrounded by a chain line. As is understandable from FIG. 5, FIG. 5 shows a memory circuit 4, an AND circuit 6, an OR circuit 7, and a selection switch 5 that correspond to each of four spin cells 1 disposed in a 2×2 matrix form (where 2 rows are denoted by Rn and Rn+1, and 2 columns are denoted by C1 and C2). Furthermore, in FIG. 5, two memory circuits 4 that are not surrounded by a chain line are memory circuits 4 included in spin cells disposed in adjacent rows Rn−1 and Rn+2 respectively.

A selection switch 5 included in a spin cell 5 includes three inputs and one output, and selects any one of the three inputs in accordance with a selection signal SELi (i=1 or 2) supplied by the control circuit 21 via a selection line, and connects the selected input to the output. Selection lines are assigned to rows one by one, and in FIG. 5, selection lines assigned to the rows Rn and Rn+1 respectively are depicted. Selection switches of plural spin cells 1 disposed in the row Rn are controlled in accordance with the selection signal SEL1 supplied from the control circuit 21 to the related selection line, and selection switches of plural spin cells 1 disposed in the row Rn+1 are controlled in accordance with the selection signal SEL2 supplied from the control circuit 21 to the related selection line.

The operations of memory circuits 4, AND circuits 6, OR circuits 7, and selection switches 5 included in the respective spin cells are equivalent to each other. Therefore, the memory circuit 4, the AND circuit 6, the OR circuit 7, and the selection switch 5 included in the spin cell 1 disposed at the intersection of the row Rn and the column C1 will be explained hereinafter as representative components.

The output of the memory circuit 4 is supplied to one of the inputs of the AND circuit 6 with two inputs, one of the inputs of the OR circuit 7 with two inputs, and an input of the switch 5. In addition, the output of a memory circuit 4 in the adjacent spin cell 1 is supplied to the other input of the AND circuit 6 with two inputs, and the other input of the OR circuit 7 with two inputs. Because the now-described spin cell 4 is disposed at the intersection of the row Rn and the column C1, the adjacent spin cell 1 is a spin cell 1 disposed at the intersection of the row Rn+1 and the column C1, and the output of a memory circuit 4 in the adjacent spin cell 1 is supplied to the other inputs of the AND circuit 6 and the OR circuit 7.

The outputs of the AND circuit 6 and the OR circuit 7 in the spin cell 1 disposed at the intersection of the row Rn and the column C1 are supplied to the inputs of the selection switch 5 respectively. The selection switch 5 selects one of the three inputs in accordance with the selection signal SEL1, and supplies the selected input into the input of the memory circuit 4 in the adjacent spin cell 1. With this, the AND circuit 6 in the spin cell (at the intersection of the row Rn and the column C1) executes logical computing to calculate a logical product of modifying data from the memory circuit 4 in the spin cell 1 (at the intersection of the row Rn+1 and the column C1) and modifying data from the memory circuit 4 in the spin cell (at the intersection of the row Rn and the column C1). Similarly, the OR circuit 7 in the spin cell (at the intersection of the row Rn and the column C1) executes logical computing to calculate a logical sum of the modifying data from the memory circuit 4 in the spin cell 1 (at the intersection of the row Rn+1 and the column C1) and the modifying data from the memory circuit 4 in the spin cell (at the intersection of the row Rn and the column C1).

As a result, the selection switch 5 supplies a logical value obtained by the logical computing to calculate the logical product, a logical value obtained by the logical computing to calculate the logical sum, or a logical value on which any logical computing is not executed is supplied to the memory circuit 4 in the adjacent spin cell 1 (at the intersection of the row Rn−1 and the column C1) in accordance with the selection signal SEL1 to write the supplied logical value. Here, the logical value on which no logical computing is executed is the output from the memory circuit 4.

A similar operation is executed in a memory circuit 4, an AND circuit 6, an OR circuit 7, and a selection switch 5 in each of other spin cells. In other words, the value of a logical product or the value of a logical sum obtained by logical computing executed using the output of a memory circuit 4 in the adjacent spin cell 1 and the output of a memory circuit 4 in the relevant spin cell, or a logical value on which no logical computing is executed is selected by the selection switch 5 in accordance with a selection signal, and the selected logical value is supplied to a memory circuit 4 in the adjacent spin cell 1.

Although only the spin cells disposed in a 2×2 matrix form (where 2 rows are denoted by Rn and Rn+1, and 2 columns are denoted by C1 and C2) are depicted, spin cells are similarly disposed at the intersections of rows and columns, and a memory circuit 4, an AND circuit 6, an OR circuit 7, and a selection switch 5 are installed in each of the spin cells. In addition, a selection signal is disposed in each row.

The control circuit 21 selects selection lines whose number is dependent on ratio data output from the ratio register 22A holding the AND ratio data among plural selection lines disposed in plural rows, and the control circuit 21 generates a selection signal, which makes a selection switch 5 select the output of an AND circuit 6 and output the selected output, for each of the selected selection lines. Furthermore, the control circuit 21 selects selection lines whose number is dependent on ratio data output from the ratio register 22O holding the OR ratio data among plural selection lines disposed in plural rows, and the control circuit 21 generates a selection signal, which makes a selection switch 5 select the output of an OR circuit 7 and output the selected output, for each of the selected selection lines. In other words, the control circuit 21 outputs a selection signal that makes selection switches 5 select the outputs of AND circuits 6 whose number is dependent on the ratio specified by the AND ratio data among the total number of the selection lines, and the control circuit 21 outputs a selection signal that makes selection switches 5 select the outputs of OR circuits 7 whose number is dependent on the ratio specified by the OR ratio data among the total number of the selection lines.

Furthermore, the control circuit 21 outputs a selection signal that makes selection switches 5 select the outputs of memory circuits 4 whose number is equal to the number of selection lines that are not specified by the AND ratio data nor the OR ratio data. With this, it becomes possible to specify the ratio of the number of outputs of AND circuits 6 (logical product outputs) that selection switches 5 select using the AND specifying information. In addition, it also becomes possible to specify the ratio of the number of outputs of OR circuits 7 (logical sum outputs) that selection switches 5 select using the OR specifying information. Furthermore, it becomes possible to set the ratio of the number of cases where logical computing is not executed, using a number that is not specified by the AND specifying information or the OR specifying information.

The modifying data, that is, the occurrence ratio of the predefined logical value ("1") in the bit sequence stored in the shift register formed by memory circuits 4 is determined by the AND specifying information and the OR specifying information. In the case where the occurrence ratio of the predefined logical value is decreased, it is necessary that the ratio of the outputs of AND circuits 6 being selected should be increased using the AND specifying information. With this, the result of the logical product of the value of a memory circuit 4 and the value of the adjacent memory circuit 4 is written in a memory circuit 4 at the next stage. When the logical product of the output of the memory circuit 4 at the previous stage and the output of the memory circuit 4 at the stage previous to the previous stage is computed, if the values of the memory circuit 4 at the previous stage and the memory circuit 4 at the stage previous to the previous stage are both "1", the logical product "1" is output, and if either of the values of the memory circuit 4 at the previous stage and the memory circuit 4 at the stage previous to the previous stage is "0", or if both are "0", the logical product "0" is output. Therefore, when the logical product of the output of the memory circuit 4 at the previous stage and the output of the memory circuit 4 at the stage previous to the previous stage is computed, there is a high possibility that the result of the logical product becomes the binary signal "0", so that the logical value written in the memory circuit 4 becomes the binary signal "0" with a high possibility.

For example, the result of the logical product computing executed using the output from the memory circuit 4 in the spin cell 1 disposed at the intersection of the row Rn and the column C1 and the output from the memory circuit 4 in the spin cell 1 disposed at the intersection of the row Rn+1 and the column C1 is written in the memory circuit 4 in the spin cell 1 disposed at the intersection of the row Rn−1 and the column C1. Therefore, if the output of the AND circuit 6 is selected by the selection switch 5, the occurrence ratio of the predefined logical value ("1") included in the bit sequence can be decreased.

On the other hand, in the case where the occurrence ratio of the predefined logical value ("1") included in the bit sequence is increased, it is necessary that the ratio of the output of the OR circuit 7 selected by the selection switch 5 should be increased using the OR specifying information. With this, the result of a logical sum obtained using the output of the memory circuit 4 in the adjacent spin cell 1 and the output of the memory circuit 4 in the relevant spin cell is written in the memory circuit 4 of the next stage. When the logical sum is computed, if the values of the memory circuit 4 at the previous stage and the memory circuit 4 at the stage previous to the previous stage are both equal to a binary signal "0", "0" is output from the selection switch 5, and if either of the values is "1", or if both are "1", a binary signal "1" is output from the selection switch 5. Therefore, there is a high possibility that the predefined logical value ("1") is output, so that the logical value written in the memory circuit 4 becomes "1" with a high possibility.

Similarly, in the case where the memory circuit 4 in the spine cell disposed at the intersection of the row Rn−1 and the column C1 is explained as an example, the result of logical computing to calculate a logical sum of the output from the memory circuit 4 in the spine cell 1 disposed at the intersection of the row Rn and the column C1 and the output from the memory circuit 4 in the spine cell 1 disposed at the intersection of the row Rn+1 and the column C1 is written. Therefore, if the output of the OR circuit 7 is selected by the selection switch 5, the occurrence ratio of the predefined logical value ("1") included in the bit sequence can be increased.

In addition, it is also possible for the selection switch 5 to select, among the plural rows, a row in which the output of the relevant memory circuit 4 is selected as it is. In other words, it is possible that the output of a memory circuit 4 in a spin cell 1 in a row which is not selected by the AND specifying information or by the OR specifying information is transferred to a row adjacent to the row. For example, such a combination is also possible that the outputs of AND circuits 6 or the outputs of OR circuits 7 in specific rows among plural rows are made to be selected, and the outputs of memory circuits 4 in rows adjacent to the specific rows (for example, in rows situated before and/or after the specific rows) can be selected using the AND specifying information and/or the OR specifying information. With the use of such a combination, the occurrence ratio of the predefined logical value can be flexibly modified.

Although, in FIG. 5, an operation example has been described in such a way that the outputs of AND circuits 6, the outputs of OR circuits 7, or the outputs of memory circuits 4 are selected per row such as the row Rn or the row Rn+1, and the selected outputs are output to the adjacent row, and are written in memory circuits 4 in the adjacent row, but the above operation example is not the only one. For example, it is also conceivable that the output of an AND circuit 6, the output of an OR circuit 7, or the output of a memory circuit 4 in each spin cell is selected, and the selected output is written in a memory circuit 4 in the adjacent spin cell 1. In this case, it goes without saying that a selection line used for transferring a selection signal (for example, SEL1 or SEL2) from the control circuit 21 to the spin cell 1 is not used for each row in common, but is used for one spin cell 1 or plural spin cells in common.

A combination of an AND circuit 6, an OR circuit 7, and a selection switch 7 included in each spin cell 1 can be considered to be a circuit for adjusting or modifying the logical value of modifying data (bit) output from a memory circuit 4 in each spin cell 1. From this view point, it can be considered that each spin cell 1 includes a memory circuit 4 for storing modifying data (bit), and an adjusting (or changing) circuit that is connected with the memory circuit 4 and supplies adjusted (or changed) modifying data (bit) to a memory circuit 4 in the adjacent spin cell 1. Here, it can be said that an adjusting circuit includes an AND circuit 6, an OR circuit 7, and a selection switch 5 that are previously explained.

Furthermore, it can be considered that the number of the predefined logical values in modifying data stored in a shift register formed by memory circuits 4 is adjusted or modified by plural adjusting circuits.

In addition, it can also be considered that an adjusting circuit has a first mode in which the result of logical computing (logical product computing or logical sum computing) using the output of the relevant memory circuit 4 and the output of a memory circuit 4 at the previous stage is transferred, and a second mode in which the output of the relevant memory circuit 4 is transferred, and the first mode or the second mode is selected by the selection signal SELi. In this case, in the second mode, the result of the logical product computing or the result of the logical sum computing is selected.

In FIG. 5, assuming that an adjusting circuit in a spin cell 1 disposed at the intersection of the row Rn and the column C1 is a first adjusting circuit, the first adjusting circuit executes logical computing (logical product computing or logical sum computing) using the data of the memory circuit 4 (a first memory circuit) of a spin cell 1 at the intersection of the row Rn+1 and the column C1 and the data of the memory circuit 4 (a second memory circuit) of the spin cell 1 at the intersection of the row Rn and the column C1. This first adjusting circuit supplies the result of the logical computing or the data of the second memory circuit to the memory circuit 4 (a third memory circuit) of a spin cell 1 at the intersection of the row Rn−1 and the column C1 in accordance with the selection signal SEL1 (a first control signal), and writes the result of the logical operation or the data of the second memory circuit in the third memory circuit 4.

Furthermore, in FIG. 5, assuming that an adjusting circuit in a spin cell 1 disposed at the intersection of the row Rn+1 and the column C2 is a second adjusting circuit, the second adjusting circuit executes logical computing using the data of the memory circuit 4 (a fourth memory circuit) of a spin cell 1 at the intersection of the row Rn and the column C2 and the data of the memory circuit 4 (a fifth memory circuit) of the spin cell 1 at the intersection of the row Rn+1 and the column C2. This second adjusting circuit supplies the result of the logical computing or the data of the fifth memory circuit to the memory circuit (a sixth memory circuit) of a spin cell 1 at the intersection of the row Rn+2 and the column C2 in accordance with the selection signal SEL2 (a second control signal), and writes the result or the data in the sixth memory circuit.

Figure 6:
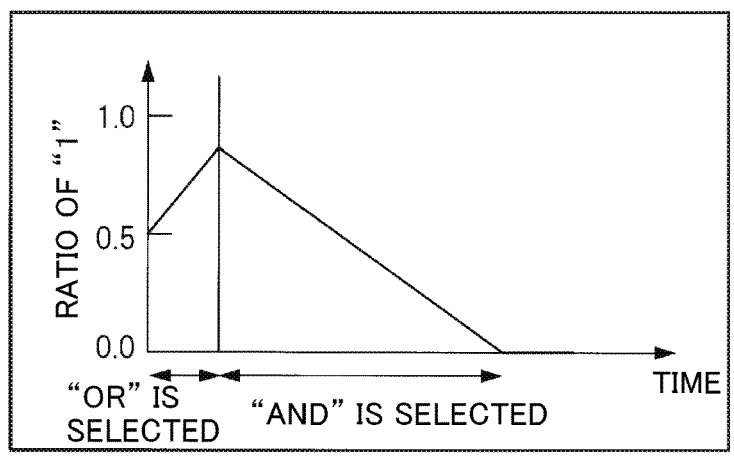
FIG. 6 is a diagram showing the occurrence ratio of the predefined logical value (the binary signal "1").

FIG. 6 is a diagram showing the occurrence ratio of the predefined logical value (the binary signal "1") when the occurrence ratio is modified using the configuration shown in FIG. 5. FIG. 5 shows an example of modifying the occurrence ratio of the predefined logical value during a time period during which an Ising model is calculated. At the start time of the Ising model calculation, the occurrence ratio of the predefined logical value in the register formed by memory circuits 4 is set about 0.5 as is the case of FIG. 4. In the early stage of the calculation, in order to increase the occurrence ratio of the predefined logical value in the register, the number of rows, in which the outputs of OR circuits 7 are selected, is increased using the OR specifying information (Refer to FIG. 5). With the elapse of time, modifying data transferred from adjusting circuits in the adjacent spin cells 1 are written in the memory circuits 4, which form the register, in the spin cells 1, and the modifying data are sequentially shifted. Because the number of rows, in which the outputs of OR circuits 7 are selected, is increased, the probability that modifying data that has been changed into the predefined logical value ("1") is output from each adjusting circuit becomes high. With this, with the elapse of time, the ratio of the predefined logical value ("1") is increased in the early stage of the calculation as shown in FIG. 6.

If the ratio of the predefined logical value becomes about 0.8, the number of rows in which the outputs of AND circuits 7 are selected is increased using the AND specifying information. With this, the probability that the logical values ("0") which are different from the predefined logical values ("1") are output from adjusting circuits is increased. With the elapse of time, an output from adjusting circuit in the adjacent spin cell 1 is written in each of memory circuits 4, and the output written in each of the memory circuits 4 is sequentially shifted. As a result, the number of logical values "0" in logical values stored in the plural memory circuits 4, which forms the register, is increased. In other words, the ratio of the predefined logical value is decreased. Although the following method is not the only one, in order to generate the ratio shown in FIG. 6, it is usual that the number of selection switches to select the outputs of OR circuits 7 in the early stage of the calculation is set larger than the number of selection switches to select the outputs of AND circuits 6 in the later stage of the calculation.

As shown in FIG. 6, the judgment whether the ratio has reached 0.8 can be achieved, for example, by reading out modifying data at that time from the shift register formed by the memory circuits 4 and by determining the number of predefined logical values ("1") included in the read-out modifying data. In other words, by setting adjusting circuits in all the rows in the abovementioned second mode, and by making each of the adjusting circuits execute a shift operation, the modifying data at that time can be brought out from the shift register formed by the memory circuits 4. By obtaining the number of predefined logical values ("1") in the modifying data brought-out in such a way, the ratio of the predefined logical value ("1") can be obtained.

<Configuration of Spin Cell 1>

Figure 7:
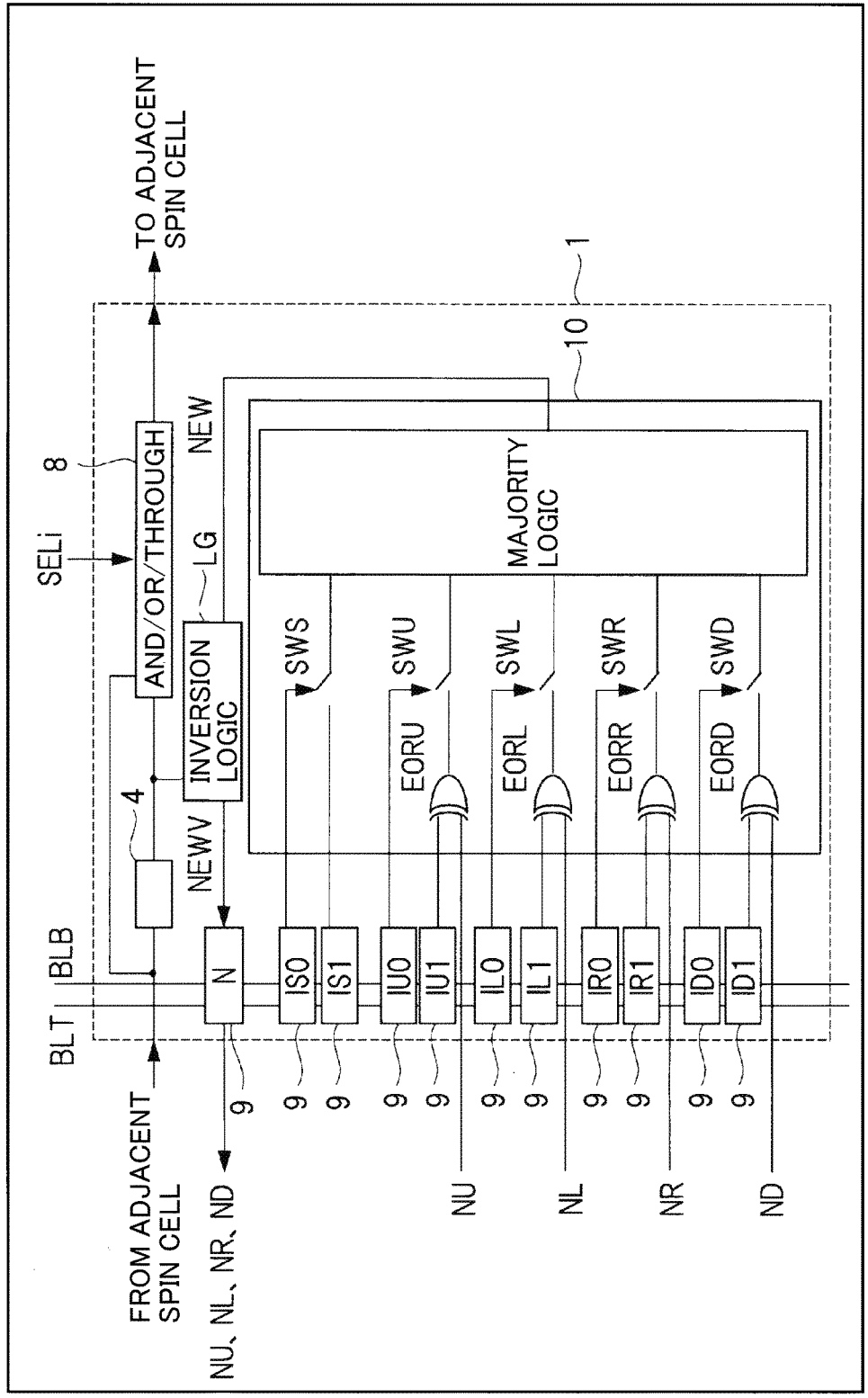
FIG. 7 is a block diagram showing the configuration of a spin cell according to the first embodiment.

FIG. 7 is a block diagram showing the configuration of a spin cell 1. As described above, a shift register that holds a bit sequence, which is modifying data, is formed by connecting plural memory circuits 4 in series. The reference sign 8 denotes an adjusting circuit, and the adjusting circuit includes an AND circuit 6, an OR circuit 7, and a selection switch 5 shown in FIG. 5, and outputs the output of the AND circuit 6, the output of the OR circuit 7, or the output of the memory circuit 4 by switching these outputs in accordance with a selection signal SELi (in FIG. 5, i=1 or 2) as explained in FIG. 5. Here, an operation, in which the output of the memory circuit 4 is output just as it is, is depicted as "THROUGH" in FIG. 7.

In addition, in FIG. 7, the reference sign 9 depicts a memory element, the reference sign 10 depicts a computing circuit for computing interactions, and the reference sign LG denotes an inversion logic circuit (a modification circuit). The spin cell 1 includes plural memory cell 9 as shown in FIG. 7. Although each memory cell 9 has the same configuration, each memory cell 9 has its own data to be stored, and a sign to show the data to be stored is attached to each memory cell 9. In the following explanation, when a memory cell is referred to, a sign denoting data to be stored in the memory cell is referred to accordingly.

A memory cell 9(N) is a memory cell for storing the spin value of this spin cell, and a memory cell 9(IS0) and a memory cell 9(IS1) are memory cell for storing external magnetic field coefficients for this spin cell respectively, where the external magnetic field coefficients to be stored are values specific to this spin cell 1. Memory cells 9(IU0, IU1, IL0, IL1, IR0, IR1, ID0, and ID1) are memory cells for storing interaction coefficients used for computing influences exerted by spin cells disposed in the vicinity of this spin cell 1 on this spin cell 1 respectively. In FIG. 7, NU, NL, NR, and ND are respectively the spin values of spin cells disposed in the vicinity of this spin cell 1. FIG. 7 shows a case where spin cells are disposed on the upside, the left side, the right side, and the downside of the page respectively with the spin cell 1 disposed at the center of FIG. 7. In other words, the four spin cells are adjacently disposed on the upside, the left side, the right side, and the downside of the spin cell 1, and these four spin cell are spin cells disposed in the vicinity of the spin cell 1 shown in FIG. 7.

Interaction coefficients of an interaction exerted by the spin cell disposed on the upside on the spin cell 1 shown in FIG. 7 are stored in the memory cells IU0 and IU1, interaction coefficients of an interaction exerted by the spin cell disposed on the left side are stored in the memory cells IL0 and IL1, and interaction coefficients of an interaction exerted by the spin cell disposed on the right side are stored in the memory cells IR0 and IR1. Similarly, interaction coefficients of an interaction exerted by the spin cell disposed on the downside are stored in the memory cells ID0 and ID1. Here, the spin value of the spin cell disposed on the upside is NU, the spin value of the spin cell disposed on the left side is NL, the spin value of the spin cell disposed on the right side is NR, and the spin value of the spin cell disposed on the downside is ND.

The spin value of the relevant spin cell 1 is supplied to the four spin cells adjacent to this spin cell 1 as the spin values NU, NL, NR, and ND respectively. Although the computation example which is executed on the basis of interactions exerted on the relevant spin cell by four spin cells adjacent to the relevant spin cell has been explained so far, the number of spin cells adjacent to the relevant spin cell is not limited to four, and even if the number is changed, each of the above spin cells has basically a similar configuration.

When the computation of interactions is executed in the Ising calculator 100, the external magnetic field coefficients from the memory cells IS0 and IS1; the interaction coefficients from the memory cells IU0, IU1, IL0, IL1, IR0, IR1, ID0, and ID1; and the spin values NU, NL, NR, and ND from the adjacent spin cells are supplied to the computing circuit 10, and the computing circuit 10 executes interaction computing on the basis of these data pieces. Schematically speaking, the interaction computing is executed on the basis of the spin values NU, NL, NR, and ND and the interaction coefficients from the adjacent spin cells disposed in the vicinity of the relevant spin cell.

In this embodiment, the computing circuit 10 includes: exclusive logical sum circuits EORU, EORL, EORR, and EORD; switches SWS, SWU, SWL, SWR, and SWD; and a majority logic circuit. The switch SWS is controlled by the external magnetic field coefficient from the memory cell IS0, and when the SWS is turned on, the external magnetic field coefficient from the memory cell IS1 is supplied to the majority logic circuit. Furthermore, the switches SWU, SWL, SWR, and SWD are controlled by the interaction coefficients from the memory cells IU0, IL0, IR0, and ID0 respectively, and when the switches SWU, SWL, SWR, and SWD are turned on, the outputs of the exclusive logical sum circuits EORU, EORL, EORR, and EORR are supplied to the majority logic circuit respectively.

The interaction coefficients stored in the memory cells IU1, IL1, IR1, and ID1, and the spin values NU, NL, NR and ND of the spin cells that correspond to the above memory cells respectively are supplied to the exclusive logical sum circuits EORU, EORL, EORR, and EORD respectively. With this, each of the exclusive logical sum circuits EORU, EORL, EORR, and EORD executes exclusive logical sum computing of the spin value of the corresponding adjacent spin cell and an interaction coefficient about the adjacent spin cell, and the result is supplied to the majority logic circuit.

For example, if there is an influence owing to the external magnetic field, the switch SWS is turned on by the external magnetic field coefficient from the memory cell IS0, and if there are influences owing to the interactions, the switches SWU, SWL, SWR, and SWD are turned on by the interaction coefficients from the memory cells IU0, IL0, IR0, and ID0 respectively. When each of the switches SWU, SWL, SWR, and SWD is turned on, an exclusive logical sum of the spin value of the corresponding adjacent spin cell and an interaction coefficient corresponding to the corresponding adjacent spin cell is computed, and the exclusive logical sum is supplied to the majority logic circuit. The majority logic circuit counts the numbers of binary values "1" and "0" in data about the external magnetic field transferred from the memory cell IS1 and data about the interactions transferred from the four exclusive logical sum circuits EORU, EORL, EORR, and EORD, and a binary value corresponding binary values ("1" or "0") whose number is larger than the number of the other binary values is output as data NEW. For example, if the number of binary numbers "0" is larger, a binary number "0" is output as the data NEW, and if the number of binary numbers "1" is larger, a binary number "1" is output as the data NEW.

On receiving the data NEW output from the majority logic circuit, the inversion logic circuit LG inverts or does not invert the logical value of the data NEW in accordance with the output of the memory circuit 4 to generate data NEWV, and writes the data NEWV in a memory cell N. For example, if the output of the memory circuit 4 is the logical value "1", the inversion logic circuit LG inverts the logical value of the data NEW to generate the data NEWV. On the contrary, if the output of the memory circuit 4 is the logical value "0", the inversion logic circuit LG does not invert the logical value of the data NEW, and outputs the data NEW as the data NEWV. In other words, the state of the data NEWV does not become opposite to the state of the data NEW.

If the output of the memory circuit 4 is the logical value "1", the data NEW, which is the computed result of the computing circuit 10, is inverted and the inverted data NEW is stored in the memory cell N in which the spin value is to be stored. In other words, if the data NEW from the computing circuit 10 is the logical value "1" ("0"), the logical value "0" ("1") is written in the memory cell in which the spin value is to be stored. Because the result of the interaction computing is inverted, the energy can be prevented from falling into in the state of a local solution as shown o FIG. 2 in the computing of the Ising calculator 100.

Modifying data is supplied to the memory circuit 4 from one adjacent spin cell, and the output of the adjusting circuit 8 is supplied to another adjacent spin cell. In this case, as explained in FIG. 5, the output from the adjusting circuit in the one adjacent spin cell is supplied to the memory circuit 4, and the output of the adjusting circuit 8 shown in FIG. 7 is supplied to the memory circuit of the other adjacent spin cell.

IN this embodiment, memory cells N, IS0, IS1, IU0, IU1, IL0, IL1, IR0, IR1, ID0, and ID1 are connected with each other with common complementary data lines BLT and BLB, and the external magnetic field coefficient and the interaction coefficients can be written and/or read via these complementary data lines BLT and BLB. In addition, as for the memory cell N for storing a spin value, the memory cell is configured in such a way that the spin value can be read from and/or written in the memory cell N.

<Configuration of Memory Cell N>

Figure 8:
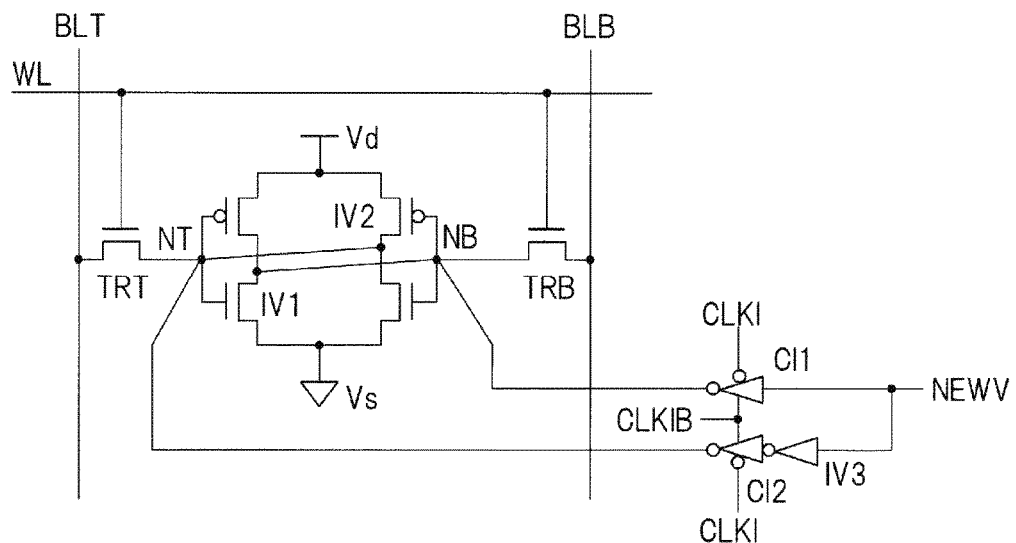
FIG. 8 is a circuit diagram showing the configuration of a memory cell according to the first embodiment.
Figure 9:
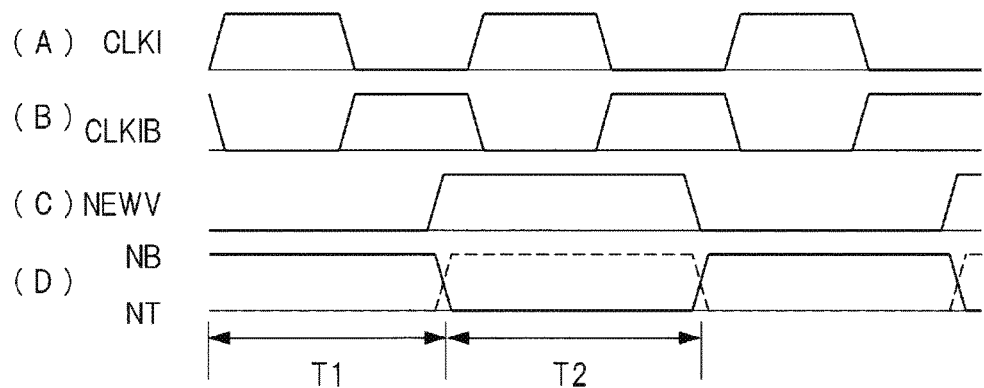
FIGS. 9(A) to (D) are waveform diagrams showing the operation of the memory cell.

FIG. 8 is a circuit diagram showing the configuration of the memory cell for holding a spin value. Furthermore, FIG. 9 shows waveform diagrams for explaining the operation of the memory cell N. The memory cell N according to this embodiment basically includes SRAMs (static random access memories). The memory cell N includes: a pair of inverter circuits IV1 and IV2 that are connected between a power supply voltage Vd and a ground voltage Vs; field effect transistors TRT and TRB (hereinafter, a field effect transistor is referred to as a MOSFET) for transfer; clock-type inverters CI1 and CI2; and an inverter circuit IV3.

A pair of the inverter circuits IV1 and IV2 is connected with their outputs and their inputs are connected crosswise. In other words, the input of the inverter circuit IV1 is connected with the output of the inverter circuit IV2 and the input of the inverter circuit IV2 is connected with the output of the inverter circuit IV1. The input of the inverter circuit IV1 is connected with the complementary data line BLT of the complementary data lines BLT and BLB via the MOSFET for transfer TRT, and the input of the inverter circuit IV2 is connected with the complementary data line BLB of the complementary data lines BLT and BLB via the MOSFET for transfer TRB. Furthermore, the gate of the MOSFET for transfer TRT and the gate of the MOSFET TRB for transfer are connected with a word line WL. The input (output) of the inverter circuits IV1 and IV2 are respectively referred to as memory nodes NT and NB.

When the word line WL is set to high-level, the MOSFET TRT for transfer and the MOSFET for transfer TRB are turned on, and then the complementary data lines BLT and BLB are connected with the memory nodes NT and NB respectively. For example, by setting the voltage of the word line WL high-level after the complementary data lines BLT and BLB are precharged by predefined voltages respectively, the voltages of the complementary data lines BLT and BLB are changed in accordance with the memory nodes NT and NB respectively. With this, data held in the memory cell N, that is, a spin value is read out.

On the other hand, as for writing a spin value in the memory cell, there are plural paths for writing a spine value in this embodiment. To put it concretely, a first write path is a write path using the complementary data lines BLT and BLB, and a second write path is a write path using the clock-type inverters CI1 and CI2.

In the first write path, the voltage value of the complementary data line BLT and the voltage value of the complementary data line BLB are determined respectively according to a spin value to be written. In this case, the voltage of the complementary data line BLT and the voltage value of the complementary data line BLB have complementary voltage values. For example, the complementary data line BLT is set to high-level, and the complementary data line BLB is set to low-level. When the MOSFETs for transfer TRT and TRB are turned on by setting the word line WL high-level, the high level of the complementary data line BLT is transferred to the memory node NT, and the low level of the complementary data line BLB is transferred to the memory node NB. A pair of the inverters IV1 and IV2, which are connected crosswise, executes a feedback operation so that the voltages of the memory nodes NT and NB corresponding to the spin value are held. With this, writing using the first write path is executed, and the spin value is held by setting the word line low-level.

In the second write path, writing a spin value in the memory cell is executed through complementary written data being transferred to the memory nodes NT and NB via the clock-type inverter circuits CI1 and CI2 respectively. In this embodiment, the data NEWV from the inversion logic circuit LG (Refer to FIG. 7) is written in the memory cell N as a spin value using this second write path.

The operations of the clock-type inverter circuits CI1 and CI2 are controlled by clock signals CLKI and CLKIB respectively. Here, the clock signals CLKI and CLKIB are complementary signals. In other words, when the clock signal CLKI becomes high-level, the clock signal CLKIB becomes low-level, and when the clock signal CLKI becomes low-level, the clock signal CLKIB becomes high-level. The clock-type inverter circuits CI1 and CI2 are activated, for example, when the clock signal CLKI becomes high-level (the clock signal CLKIB becomes low-level) respectively. In other words, at this time, the clock-type inverter circuits CI1 and CI2 invert signals supplied thereto respectively, and output the inverted signals respectively. On the other hand, when the clock signal CLKI is low-level (the clock signal CLKIB is high-level), the outputs of the clock-type inverter circuits CI1 and CI2 go into a high impedance state respectively.

The data NEWV from the inversion logic circuit LG (Refer to FIG. 7) is supplied to the input of the clock-type inverter circuit CI1, and the data NEWV is supplied to the input of the clock-type inverter circuit CI2 via the inverter circuit IV3. In addition, the output of the clock-type inverter circuit CI1 is connected with the memory node NB, and the output of the clock-type inverter circuit CI2 is connected with the memory node NT. With this, the clock-type inverter circuit CI1 supplies a voltage obtained by inverting the data NEWV to the memory node NB when the clock-type inverter circuit CI1 is activated, and the clock-type inverter circuit CI2 supplies a voltage whose phase is equal to that of the data NEWV to the memory node NT when the clock-type inverter circuit CI2 is activated. With this, the voltages of the memory nodes NB and NT become voltages based on the data NEWV respectively without turning the word line WL high-level, and hence writing the data NEWV is executed. In addition, by setting the clock signal CLKI low-level, the memory nodes NB and NT can be prevented from being changed on the basis of the data NEWV, the spin value is held.

Next, the operation of the second write path will be explained with reference to FIG. 9. FIG. 9(A) shows the voltage waveform of the clock signal CLKI, and FIG. 9(B) shows the voltage waveform of the clock signal CLKIB. Furthermore, FIG. 9(C) shows the voltage waveform of the data NEWV output from the inversion logic circuit LG, and FIG. 9(D) shows the voltage waveforms of the memory nodes NT and NB. In FIG. 9, the horizontal axis represents time, and the vertical axis represents voltage.

As described above, the clock signal CLKI and the clock signal CLKIB are complementary signals. Therefore, as shown in FIGS. 9(A) and (B), the state of the clock signal CLKI and the state of the clock signal CLKIB are opposite to each other. If the clock signal CLKI turns from low-level to high-level, the memory nodes NB and NT change on the basis of the voltage of the data NEWV at that time respectively. If the clock signal CLKI becomes low-level, because the outputs of the clock-type inverter circuits CI1 and CI2 go into a high impedance state respectively, the voltages of the memory nodes NB and NT are held respectively. In FIG. 9, when the clock signal CLKI turns high-level during a time period T1, because the data NEWV is low-level, the memory node NB becomes high-level, and the memory node NT becomes low-level. Next, because the clock signal CLKI turns low-level, the voltages of the memory nodes NB and NT are held. During the next time period T2, because the data NEWV is high-level, the voltage of the memory node NB becomes low-level, and the voltage of the memory node NT becomes high-level. In this way, a spin value is written in the memory cell N in accordance with the data NEWV supplied from the inversion logic circuit LG, and the written spin cell value is held.

In this embodiment, if interaction computing is executed by the computing circuit 10 (Refer to FIG. 5), the result of the computing is inverted or not inverted by the inversion logic circuit LG (Refer to FIG. 5) and supplied to the memory cell N as data NEWV. In the memory cell N, the data NEWV is written in synchronization with the clock signal CLKI (CLKIB) using the abovementioned second write path. In other words, a value corresponding to a spin value obtained by the computing is written in the memory cell N. Furthermore, the spin value stored in the memory cell N can be read out by setting the word line WL to high-level. In addition, by setting a spin value to the complementary data lines BLT and BLB, and by setting the word line WL high-level, the spin value can be written in the memory cell N using the first write path in which the complementary data lines BLT and BLB are used.

The configuration of the memory cell N shown in FIG. 8 is an example, and the configuration of the memory cell N is not limited to this configuration. For example, although, in FIG. 8, a so-called CMOS-type inverter circuit including a P channel-type MOSFET (herein after, referred to as a P-type MOSFET) and an N channel-type MOSFET (herein after, referred to as a N-type MOSFET) is used as a pair of inverter circuits, an inverter circuit having a high resistive element as a load can also be used.

<Configuration of Computing Circuit 10>

Figure 10:
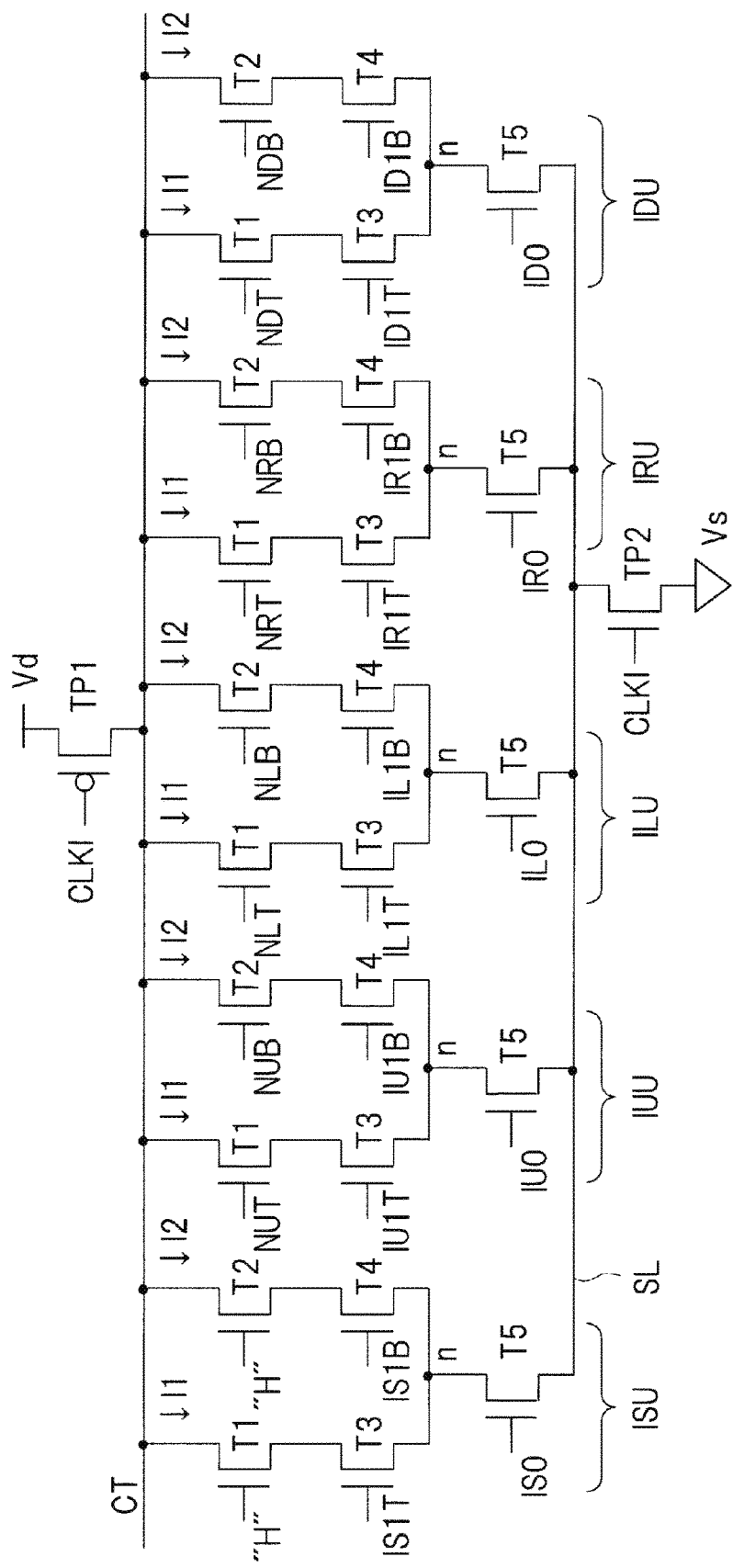
FIG. 10 is a circuit diagram showing the configuration of a computing circuit according to the first embodiment.
Figure 11:
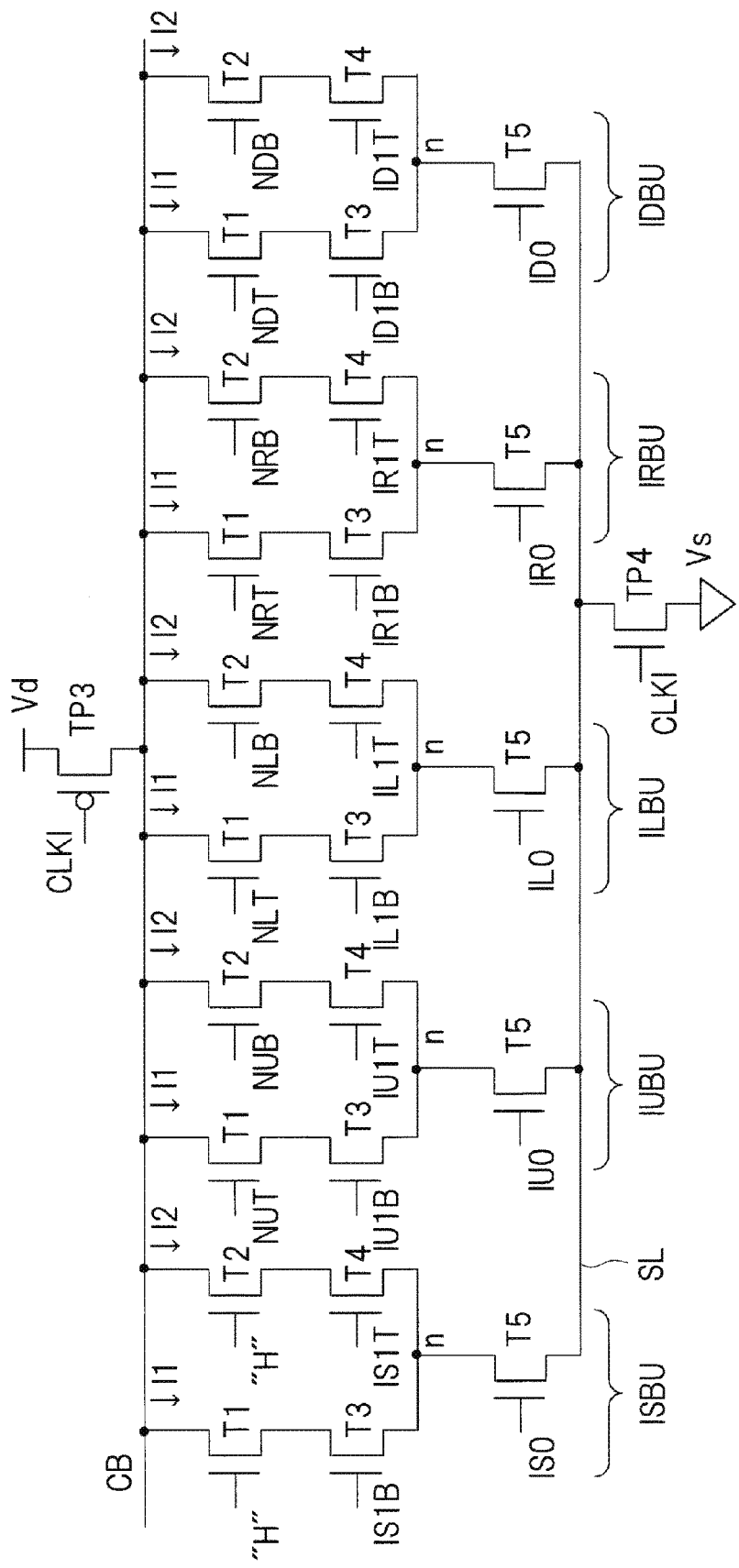
FIG. 11 is a circuit diagram showing the configuration of a computing circuit according to the first embodiment.
Figure 12:
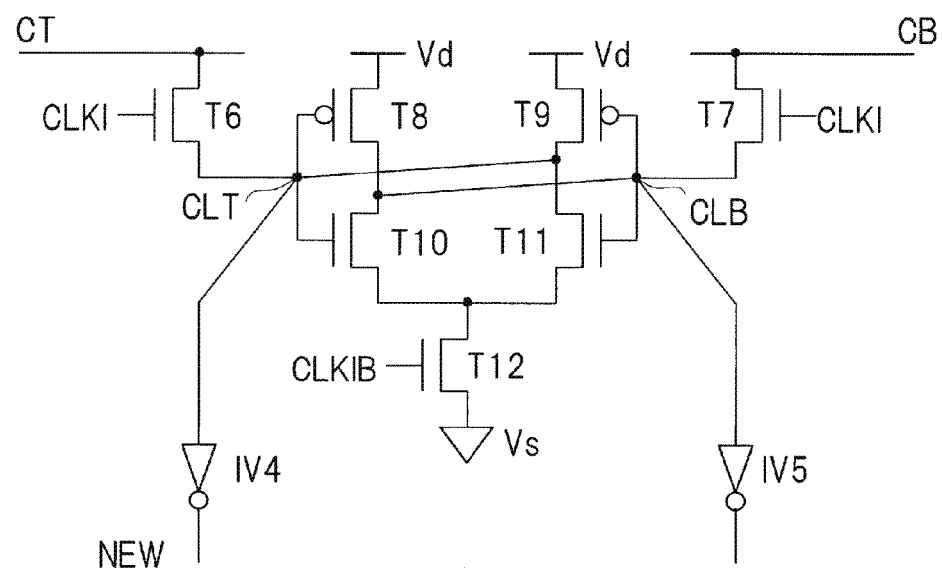
FIG. 12 is a circuit diagram showing the configuration of a computing circuit according to the first embodiment.

Next, an example of a configuration of the computing circuit 10 shown in FIG. 7 and the operation thereof will be explained with reference to FIG. 10 to FIG. 13. FIG. 10 to FIG. 12 are circuit diagrams showing the configuration of the computing circuit 10. Furthermore, FIGS. 13(A) to (E) are waveform diagrams showing the operation of the computing circuit 10. In order to prevent these drawings from becoming complicated, the configuration of the computing circuit 10 is separately shown by FIG. 10 to FIG. 12. In addition, signals that are equal to the signals from memory cells IS1, IU1, IL1, IR1, and ID1 whose phases are inverted by inversion circuits (not shown) are generated although these signals are not shown.

In order to make the following explanation easy to understand, the external magnetic field coefficients from the memory cells IS0 and IS1 are referred to as signals IS0 and IS1 respectively. Furthermore, the interaction coefficients supplied from the memory cells IU0, IL0, IR0, and ID0 are referred to as signals IU0, IL0, IR0, and ID0 respectively. In addition, the interaction coefficients supplied from the memory cells IU1, IL1, IR1, and ID1 are referred to as signals IU1, IL1, IR1, and ID1 respectively. Furthermore, signals that are equal to the signals IU1T, IL1T, IR1T, and ID1T whose phases are inverted by inverter circuits (not shown) are referred to as signals IU1B, IL1B, IR1B, and ID1B.

In FIG. 7, in order to make the computing circuit 10 easy to understand, the configuration of the computing circuit 10 has been explained in the way that the configuration includes functions such as the exclusive logical sum circuits, the switches, and the majority logic circuit. FIG. 10 to FIG. 12 show the circuits of the computing circuit 10 that implement these functions efficiently. To put it concretely, circuits shown in FIG. 10 and FIG. 11 compute exclusive logical sums of spin values from adjacent spin cells and interaction coefficients about the corresponding adjacent spin cells respectively, and the plural computed exclusive logical sums are added in terms of current. By adding the plural computed exclusive logical sums in terms of current, a current corresponding to the difference between the number of logical values "1" and the number of logical value "0" is obtained. The current corresponding to the difference of the two numbers is converted into a voltage, and the voltage is supplied to a circuit shown in FIG. 12. In the circuit shown in FIG. 12, the voltages supplied from the circuits shown in FIG. 10 and FIG. 11 are compared with each other, and the comparison result is output as data NEW.

Next, the configuration of the computing circuit 10 will be concretely explained with reference to FIG. 10 to FIG. 12. In FIG. 10, the reference sign CT is a first common line that forms a pair with a second common line CB, which is shown in FIG. 11 and will be explained later, and the first common line CT is connected with a power supply voltage Vd via a P-type MOSFET TP1. A clock signal CLKI is supplied to the gate of this P-type MOSFET T1, and when the clock signal CLKI becomes low-level, the first common line CT is precharged with the power supply voltage Vd. In addition, in FIG. 10, the reference sign SL denotes a common ground line, and the common ground line SL is connected with a ground voltage Vs via an N-type MOSFET TP2. The clock signal CLKI is supplied to the gate of this N-type MOSFET TP2, and when the clock signal CLK becomes high-level, the common ground line SL is precharged with the ground voltage Vs.

Plural exclusive logic circuits ISU, IUU, ILU, IRU, and IDU are connected with each other in parallel between the first common line CT and the common ground line SL. The plural exclusive logic circuits ISU, IUU, ILU, IRU, and IDU have the same configuration, and only signals supplied to these logic circuits are different from each other.

More specifically, the external magnetic field coefficient signals IS0, IS1T, and IS1B and, for example, a high-level voltage equivalent to the power supply voltage Vd (depicted as "H" in FIG. 10) are supplied to the unit exclusive logic circuit ISU. Furthermore, signals NUT and NUB corresponding to the spin value of an adjacent spin cell, and the interaction coefficient signals IU0, IU1T, and IU1B between the relevant spin cell and this adjacent spin cell are supplied to the unit exclusive logic circuit IUU. Signals NLT and NLB corresponding to the spin value of an adjacent spin cell, and the interaction coefficient signals IL0, IL1T, and IL1B between the relevant spin cell and this adjacent spin cell are supplied to the unit exclusive logic circuit ILU.

Signals NRT and NRB corresponding to the spin value of an adjacent spin cell, and the interaction coefficient signals IR0, IR1T, and IR1B between the relevant spin cell and this adjacent spin cell are supplied to the unit exclusive logic circuit IRU. In addition, signals NDT and NDB corresponding to the spin value of an adjacent spin cell, and the interaction coefficient signals ID0, ID1T, and ID1B between the relevant spin cell and this adjacent spin cell are supplied to the unit exclusive logic circuit IDU.

Because the unit exclusive logic circuits ISU, IUU, ILU, IRU, and IDU have the same configuration, the configuration and operation of the unit exclusive logic circuit IUU will be explained hereinafter as a representative unit. The unit exclusive logic circuit IUU has a logical computing function, that is, an exclusive logical sum function, and the function of the switch SWU. The exclusive logical sum function is achieved by two series circuits that are connected in parallel between the first common line CT and a node n. One series circuit of the two series circuits includes N-type MOSFETs T1 and T3 connected with each other, and the other series circuit includes N-type MOSFETs T2 and T4 connected with each other. Furthermore, the function of the switch function SWU is achieved by an N-type MOSFET T5 connected between the node n and the common ground line SL.

The signal NUT corresponding to the spin value of the adjacent spin cell is supplied to the gate of the N-type MOSFET T1 included in the one series circuit, and the signal IU1T of the interaction coefficient between the relevant spin cell and the adjacent spin cell is supplied to the gate of the N-type MOSFET T4. In addition, the signal NUB, which is a signal obtained by inverting the signal IU1T, is supplied to the gate of the N-type MOSFET T2 included in the other series circuit, and the signal IU1B, which is a signal obtained by inverting the signal NUT, is supplied to the gate of the N-type MOSFET T3. In addition, the interaction coefficient signal IU0 between the relevant spin cell and the adjacent spin cell is supplied to the gate of the N-type MOSFET T5.

After the first common line CT is precharged by the P-type MOSFET TP1, the N-type MOSFET TP2 is turned on. When the N-type MOSFET TP2 is turned on, the computing circuit 10 starts computing. At this time, if the interaction coefficient signal IU0 is high-level, the N-type MOSFET T5 is turned on. If one of the signal NU corresponding to the spin value and the interaction coefficient signal IU1 becomes high-level and the other becomes low-level during the time period during which this N-type MOSFET T5 is on, a current I1 or a current I2 flows through either of the two series circuits.

On the contrary, if both signal NU corresponding to the spin value and interaction coefficient signal IU1 becomes high-level or low-level during the time period during which the N-type MOSFET T5 is on, neither the current I1 nor the current I2 flows through the two series circuits. Because the current I1 or the current I2 flows through the unit exclusive logic circuit IUU, the voltage of the first common line CT decreases from the power supply voltage Vd to the ground voltage Vs. On the other hand, when currents I1 and I2 do not flow, the voltage of the first common line CT is kept equal to the power supply voltage Vd.

As described above, the unit exclusive logic circuit IUU includes the function of the switch SWU, and at the same time, computes an exclusive logical sum between the signal NUT (NUTB) corresponding to the spin value of an adjacent spin cell and the interaction coefficient signal IU1T (IU1B) between the relevant spin cell and the adjacent spin cell, and outputs the computed value as the current (I1 or I2) from the first common line CT.

In other words, when the logical value of the spin value (the signal IU1T) of the adjacent spin cell and the logical value of the interaction coefficient value (the signal NUT) between the relevant spin cell and this adjacent spin cell is the same, the voltage of the first common line CT is decreased and the logical value "0" is generated, and when they are different from each other, the voltage of the first common line CT is kept and the logical value "1" is generated.

When the signal IU0 is low-level, the N-type MOSFET T5 is off. Therefore, the currents (I1 and I2) do not flow through the unit exclusive logic circuit IUU at this time at this time. The interaction coefficient stored in the memory cell IU0 can be considered to be a coefficient for deciding whether or not the influence of the interaction from the adjacent spin cell is brought in. In this case, if the signal IU0 from the memory cell IU0 is high-level (logical value "1"), the influence of the interaction from the adjacent spin cell is brought in the interaction computing, and if low-level (logical value "0"), the influence of the interaction from the adjacent spin cell is not bought in the computing.

Other unit exclusive logic circuit ILU, IRU, and IDU include the functions of the switches SWL, SWR, and SWD respectively, and at the same time, each unit exclusive logic circuit computes an exclusive logical sum between a signal corresponding to a spin value given thereto and an interaction coefficient signal given thereto, and outputs the computed value as a current from the first common line CT.

In the unit exclusive logic circuit ISU, high-level voltages are always supplied to the gates of the N-type MOSFETs T1 and T2 respectively, the signal IS1T is supplied to the gate of the N-type MOSFET T3, and the signal IS1B, which is obtained by inverting the signal IS1T, is supplied to the gate of the N-type MOSFET T4. Furthermore the external magnetic field coefficient signal IS0 is supplied to the gate of the N-type MOSFET T5 that functions as the switch SWU. With this, when the N-type MOSFET T5 is turned on by the external magnetic field signal IS0, a current (I1 or I2) flows through the unit exclusive logic circuit ISU regardless of the voltage of the external magnetic field coefficient IS1T.

In this case, although it is conceivable that the N-type MOSFETs T3 and T4 are connected between the node n and the first common line CT respectively without implementing the N-type MOSFETs T1 and T2, the configuration of the unit exclusive logic circuit ISU becomes the same as those of other unit exclusive logic circuits by implementing the N-type MOSFETs T1 and T2, and the same patterns are repeated, hence these configurations are suitable for manufacturing a semiconductor integrated circuit apparatus.

The result of an exclusive logical sum computed by each unit exclusive logic circuit is represented by whether a current is flowed from the first common line CT to the common ground line SL. Therefore, a time period during which the voltage of the first common line CT decreases from the precharged voltage to the ground voltage Vs depends on the number of the unit exclusive logic circuits through which currents flow.

FIG. 11 shows a circuit that executes the computing of interactions as is the case with FIG. 10. The circuit shown in FIG. 11 is similar to the circuit shown in FIG. 10. In FIG. 11, the reference sign CB shows a second common line, and the reference sign SL shows a common ground line. The second common line is connected with a power supply voltage Vd via a P-type MOSFET TP3, which is controlled by a clock signal CLKI, as is the case with the first common line CT shown in FIG. 10. In addition, the common ground line SL is connected with a ground voltage Vs via an N-type MOSFET TP4 that is controlled by the clock signal CLKI.

The circuit, which is shown in FIG. 11 and executes computing, includes plural unit exclusive logic circuits ISBU, IUBU, ILBU, IRBU, and IDBU as is the case with FIG. 10, and these unit exclusive logic circuits ISBU, IUBU, IRBU, and IDBU are connected with each other in parallel between the second common line and the common ground line SL. The configuration of each of these unit exclusive logic circuits ISBU, IUBU, ILBU, IRBU, and IDBU is the same as that of each of these unit exclusive logic circuits ISU, IUU, ILU, IRU, and IDU shown in FIG. 10, and additionally signals that are the same as the signals supplied to the unit exclusive logic circuits ISU, IUU, ILU, IRU, and IDU are supplied to the unit exclusive logic circuits ISBU, IUBU, ILBU, IRBU, and IDBU respectively.

However, signals are supplied to the gates of the N-type MOSFETs of each of the unit exclusive logic circuits shown in FIG. 11 differently from signals in FIG. 10. In other words, although signals NUT, NUB, IU1T, IU1B, and IU0 that are the same as the signals supplied to the unit exclusive logic circuit IUU shown in FIG. 10 are supplied to the unit exclusive logic circuit IUBU shown in FIG. 11, the signals are supplied to the exclusive logic circuit IUBU shown in FIG. 11 so that the unit exclusive logic circuit IUBU outputs a logic result that is complementary to the logical result of the unit exclusive logic circuit IUU. The same can be said for other unit exclusive circuits, hence the unit exclusive logic circuit ILBU outputs a logic result that is complementary to the logical result of the unit exclusive logic circuit ILU, the unit exclusive logic circuit IRBU outputs a logic result that is complementary to the logical result of the unit exclusive logic circuit IRU, and the unit exclusive logic circuit IDBU outputs a logic result that is complementary to the logical result of the unit exclusive logic circuit IDU. Here, the unit exclusive logic circuit ISBU involved with the external magnetic field coefficient outputs a logic result that is the same as the logical result of the unit exclusive logic circuit ISU.

Also in this case, the configuration and operation of the unit exclusive logic circuit IUBU, which is a counterpart of the unit exclusive logic circuit IUU, will be explained hereinafter as a representative unit exclusive logic circuit. The configuration of the unit exclusive logic circuit IUBU is the same as that of the unit exclusive logic circuit IUU, and includes two series circuits connected with each other in parallel between a node n and the common line CB and an N-type MOSFET T5 between the node n and the common ground line SL. The interaction coefficient signal NUT is supplied to the gate of an N-type MOSFET T1 and the signal IU1B corresponding to a spin value is supplied to the gate of an N-type MOSFET T3, where the N-type MOSFET T1 and the N-type MOSFET T3 form one of the two series circuits. On the other hand, the interaction coefficient signal NUB is supplied to the gate of an N-type MOSFET T2 and the signal IU1T corresponding to the spin value is supplied to the gate of an N-type MOSFET T4, where the N-type MOSFET T2 and the N-type MOSFET T4 form the other of the two series circuits.

After the P-type MOSFET TP3 is turned on by a clock signal CLK1, and the second common line CB is precharged by the power supply voltage Vd, the click signal CLK1 is turned high-level. With this, similarly to the abovementioned case, interaction computing is started. In the case where it is directed that the influence of an interaction owing to the spin value of the adjacent spin cell should be brought in, that is, in the case where the signal IU0 is set to high-level, if the level of the signal NUT and the level of the signal IU1T are different from each other (one is high-level and the other is low-level), the N-type MOSFETs T1 and T3 are turned on or the N-type MOSFETs T2 and T4 are turned on. With this, a current (I1 or I2) flows through either of the two series circuits.

On the other hand, if the level of the signal NUT and the level of the signal IU1T are in the same level, the N-type MOSFETs T1 or T3 are turned off or the N-type MOSFETs T2 or T4 are turned off. As a result, when both signal NUT and signal IU1T are in the same level, neither of the currents (I1 and I2) flows through the two series circuits. With this, the voltage of the second common line CB is decreased when the signal NUT and the signal IU1T are in the same level, and the voltage of the second common line CB is kept as it is when the level of the signal NUT and the level of the signal IU1T are different from each other.

In other words, when the spin value (the signal NUT) and the interaction coefficient (the signal IU1T) have different logical values, the voltage of the second common line CB is decreased, and when the spin value (the signal NUT) and the interaction coefficient (the signal IU1T) have the same logical values, the voltage of the second common line CB is kept as it is. As a result, the unit exclusive logic circuit IUBU outputs a computing result complementary to the computing result output by the unit exclusive logic circuit IUU shown in FIG. 10.

Other unit exclusive logic circuits ILBU, IRBU, and IDBU outputs computing results complementary to the computing results output by the unit exclusive logic circuits ILU, IRU, and IDU shown in FIG. 10 respectively. Here, the unit exclusive logic circuit ISBU involved with the external magnetic field coefficient outputs a logic result that is the same as the logical result of the unit exclusive logic circuit ISU shown in FIG. 10.

As is the case with the voltage of the first common line CT shown in FIG. 10, a time period during which the voltage of the second common line CB decreases from the precharged power supply voltage Vd to the ground voltage Vs depends on currents flowing through the unit exclusive logic circuits ISBU, IUBU, ILBU, IRBU, and IDBU. In other words, the voltage of the second common line CB depends on the number of the unit exclusive logic circuits through which currents flow.

In each of the unit exclusive logic circuits IUU, ILU, IRU, and IDU shown in FIG. 10, when the corresponding spin value and interaction coefficient have the same logical values, a current (I1 or I2) flows. On the contrary, in each of the unit exclusive logic circuits IUBU, ILBU, IRBU, and IDBU shown in FIG. 11, when the corresponding spin value and interaction coefficient have different logical values from each other, a current (I1 or I2) flows.

Therefore, if there are many cases where a spin value from an adjacent spin cell, and an interaction coefficient between the relevant spin cell and this adjacent spin cell have the same logical value, the voltage of the second common line CB decreases more gradually than the voltage of the first common line CT. In other words, when there are many cases where a spin value from an adjacent spin cell, and an interaction coefficient between the relevant spin cell and the adjacent spin cell have different logical values, the voltage of the first common line CT decreases more gradually than the voltage of the second common line CB.

FIG. 12 shows a circuit in which data NEW is generated on the basis of a time difference between the decrease of the voltage of the first common line CT and the decrease of the voltage of the second common line CB. In FIG. 12, reference signs CT and CB denote the above-described first common line and second common line respectively. Furthermore, in FIG. 12, reference signs T8 and T9 denote P-type MOSFETs, and reference signs T6, T7 and T10 to T12 denote N-type MOSFETs.

The source of the P-type MOSFET T8 is connected with a power supply voltage Vd, the drain of the P-type MOSFET T8 is connected with the drain of the N-type MOSFET T10, and the gate of the P-type MOSFET T8 is connected with the gate of the N-type MOSFET T10. In addition, the source of the P-type MOSFET T9 is connected with the power supply voltage Vd, the drain of the P-type MOSFET T9 is connected with the drain of the N-type MOSFET T11, and the gate of the P-type MOSFET T9 is connected with the gate of the N-type MOSFET T11. The sources of the N-type MOSFETs T10 and T11 are respectively connected with a ground voltage Vs via the N-type MOSFET T12 for switching.

The gate of the P-type MOSFET T8, the gate of N-type MOSFET T10, the drain of the P-type MOSFET T9 and the drain of the N-type MOSFET T11 are respectively connected with an input/output node CLT. The input/output node CLT is connected with the first common line CT via the N-type MOSFET for transfer T6, and further connected with an inverter circuit IV4. Furthermore, the gate of the P-type MOSFET T9, the gate of the N-type MOSFET T11, the drain of the P-type MOSFET T8, and the drain of the N-type MOSFET T10 are respectively connected with an input/output node CLB. The input/output node CLB is connected with the second common line CB via the N-type MOSFET for transfer T7, and further connected with the inverter circuit IV5.

The N-type MOSFET for transfer T6 and the N-type MOSFET for transfer T7 are switchingly controlled by a clock signal CLKI respectively, and the N-type MOSFET T12 for switching is switchingly controlled by a clock signal CLKIB.

By setting the clock signal CLKI high-level, the N-type MOSFET T6 and the N-type MOSFET T7 are turned on, the voltage of the first common line CT is transferred to the input/output node CLT, and the voltage of the second common line CB is transferred to the input/output node CLB.

When the clock signal CLKI becomes low-level and clock signal CLKIB becomes high-level, the N-type MOSFET T12 for switching is turned on. With this, the ground voltage Vs is supplied to the sources of the N-type MOSFETs T10 and T11, hence a first inverter circuit is formed by the P-type MOSFET T8 and the N-type MOSFET T10. Similarly, a second inverter circuit is formed by the P-type MOSFET T9 and the N-type MOSFET T11. Because the input and output of the first inverter circuit and the input and output of the second inverter circuit are connected crosswise, a combination of the two inverters executes a feedback operation in such a way that the voltage difference between the input/output nodes CLT and CLB is amplified.

In this embodiment, the voltage of the input/output node CLT is buffered by the inverter circuit IV4, and the inverted voltage is output as the data NEW, although this is not the only method. It goes without saying that the output of the inverter IV5 can also be treated as the data NEW, or the data NEW can be generated using both output of the inverter circuit IV4 and output of the inverter circuit IV5.

Figure 13:
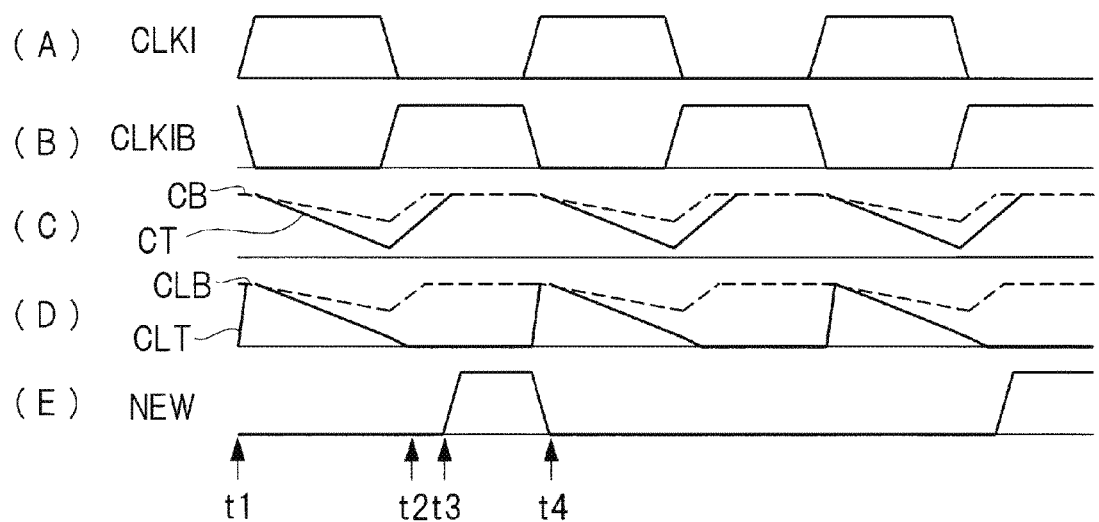
FIGS. 13(A) to (E) are waveform diagrams showing the operation of the computing circuit.

FIG. 13 is a waveform diagram for explaining the operation of the computing circuit 10 shown in FIG. 10 to FIG. 12. In FIG. 13, the horizontal axis represents time, and the vertical axis represents voltage. FIG. 13(A) shows the voltage waveform of the clock signal CLKI and the clock signal CLKI varies periodically. FIG. 13(B) shows the voltage waveform of the clock signal CLKIB that is generated by inverting the clock signal CLKI in terms of phase. Because the clock signal CLKI varies periodically, the clock signal CLKIB also varies periodically.

FIG. 13(C) shows the voltage changes of the first common line CT and the second common line CB respectively. Here, the voltage change of the second common line CB is shown in dashed lines. In addition, FIG. 13(D) shows the voltage changes of the input/output nodes CLT and CLB. Here, the voltage change of the input/output node CLB is also shown in dashed lines. FIG. 13(E) shows the voltage change of the data NEW output from the computing circuit 10. The data NEW shown in this FIG. 13(E) can be considered to be equivalent to the output of the inverter IV4 shown in FIG. 12.

At the time point before the time t1, the clock signal CLKI is low-level. With this, the P-type MOSFETs TP1 and TP3 are turned on, and the first common line CT and the second common line CB are precharged with the power supply voltage Vd. Because the clock signal CLKI becomes high-level at the time t1, the N-type MOSFETs TP2, TP4 and the N-type MOSFETs for transfer T6, TP4 are turned on. With this, the computing circuit 10 starts interaction computing.

On the other hand, the spin values from the spin cells disposed in the vicinity (NU, NL, NR, and ND) and the interaction coefficient signals (IU0, IL0, IR0, ID0, IU1, IL1, IR1, and ID1) corresponding to the respective spin cells are supplied to the respective unit exclusive logic circuits shown in FIG. 10 and FIG. 11. Furthermore, the external magnetic field coefficient signals (IS0, IS1) are also supplied to the respective unit exclusive logic circuits shown in FIG. 10 and FIG. 11. The voltages of the first common line CT and the voltage of the second common line CB are decreased gradually from the power supply voltage Vd respectively on the basis of the number of accordant cases (or the number of discordant cases) of the logical values of the spin values and the logical values of the interaction coefficients at this time. The speeds of the decreases of the voltages of the first common line CT and the voltage of the second common line CB change on the basis of the number of accordant cases (or the number of discordant cases) of the logical values of the spin values and the logical values of the interaction coefficients at this time. In other words, if the number of accordant cases is larger than the number of discordant cases, the voltage of the first common line CT is decreased more rapidly than the voltage of the second common line CB, and if the number of discordant cases is larger than the number of accordant cases, the voltage of the second common line CB is decreased more rapidly than the voltage of the first common line CT. To take up a time period between the time t1 and the time t2 as an example, the number of accordant cases of the logical values of the spin values and the logical values of the interaction coefficients is larger than the number of discordant cases, therefore the voltage of the first common line CT is decreased more rapidly than the voltage of the second common line CB during this time period. The voltage changes of these first common line CT and second common line CB are transferred to the input/output nodes CLT and CLB via the N-type MOSFETs T6 and T7 respectively.

Next, at the time t3, if the clock signal CLKI is set to low-level and the clock signal CLKIB is set to high-level, the N-type MOSFET T12 for switching is tuned on. With this, a feedback operation is started by the inverter circuit formed by the P-type MOSFET T8 and the N-type MOSFET T10 and the inverter circuit formed by the P-type MOSFET T9 and the N-type MOSFET T11, and the voltage difference between the input/output nodes CLT and CLB is amplified. At the time t3 after the time t2, data NEW whose voltage value is depending on the voltage of the input/output node CLT is output from the inverter circuit IV4.

In addition, at the time t3, because the clock signal CLKI becomes low-level, the P-type MOSFETs TP1 and TP3 are turned on, and the precharges of the first common line CT and the second common line CB are executed again. At this time, because the N-type MOSFETs for transfer T6 and T7 are turned off, during a time period when the precharges of the first common line CT and the second common line CB are executed, the first common line CT and the second common line CB are electrically isolated from the input/output nodes CLT and CLB respectively. At the time T4, the clock signal CLKI becomes high-level, and afterward the above-described operation is repeated.

As described above, if the number of accordant cases of the logical values of the spin values and the logical values of the interaction coefficients is larger than the number of discordant cases, the voltage of the first common line CT is decreased more rapidly than the voltage of the second common line CB. On the contrary, if the number of discordant cases is larger than the number of accordant cases, the voltage of the first common line CT is decreased more slowly than the voltage of the second common line CB. For example, when the voltage of the first common line CT and the voltage of the second common line CB are observed at a predefined timing such as at the time t2, if the number of accordant cases is larger, the voltage of the first common line CT is lower than the voltage of the second common line CB. On the contrary, if the number of discordant cases is larger, the voltage of the first common line CT is higher than the voltage of the second common line CB.

In exclusive logical sum computing with two inputs, if the two inputs are accordant with each other, the computing result becomes "0", and if the two inputs are discordant with each other, the computing result becomes "1". At the above predefined timing, in the result of the plural exclusive logical computing operations regarding the voltage of the first common line CT between the spin values and the interaction coefficients regarding the adjacent spin cells, if the number of accordant cases is larger than the number of discordant cases, the voltage of the first common line CT becomes lower than the voltage of the first common line CB, and on the contrary, if the number of accordant cases is smaller than the number of discordant cases, the voltage of the first common line CT becomes higher than the voltage of the first common line CB. That is to say, the voltage of the first common line CT becomes higher or lower than the voltage of the second common line CB in accordance with a majority logical value in the result of the exclusive logical computing operations. In other words, the voltage of the first common line CT is decided by the majority decision of the result of the plural exclusive logical computing operations. Similarly, the voltage of the second common line CB is also decided by the majority decision of the result of the plural exclusive logical computing operations.

In this embodiment, the voltage difference between the first common line CT and the second common line CB is amplified by the feedback operation. For example, if the voltage of the first common line CT is lower than the voltage of the second common line CB, the voltage of the input/output node CLT becomes low-level, and the voltage of the input/output node CLB becomes high-level. On the contrary, if the voltage of the first common line CT is higher than the voltage of the second common line CB, the voltage of the input/output node CLT becomes high-level, and the voltage of the input/output node CLB becomes low-level. In other words, if the number of accordant cases between the logical values of the spin values and the logical values of the interaction coefficients is larger than the number of discordant cases, the input/output node CLT becomes high-level, and if the number of accordant cases is smaller than the number of discordant cases, the input/output node CLT becomes low-level. Furthermore, because the data NEW is a signal obtained by inverting the voltage of the input/output node CLT, if the number of accordant cases between the logical values of the spin values and the logical values of the interaction coefficients is larger than the number of discordant cases, the data NEW becomes high-level, and if the number of accordant cases is smaller than the number of discordant cases, the data NEW becomes low-level.

In this embodiment, although the voltage difference between the first common line CT and the second common line CB is amplified by the feedback operation, this can also be considered to be equivalent to the fact that, after comparing the voltage of the first common line CT with the voltage of the second common line CB, the voltage difference is enlarged. By comparing the voltage of the first common line CT with the voltage of the second common line CB, it can be judged whether or not the number of accordant cases between the logical values of the spin values and the logical values of the interaction coefficients is larger than the number of discordant cases. Therefore, the circuit shown in FIG. 12 is not only one circuit, and a comparison circuit for comparing the voltage of the first common line CT with the voltage of the second common line CB can also be used.

In this embodiment, the voltage of the first common line CT and the voltage of the second common line CB change respectively in accordance with the number obtained from the result of the exclusive logical sums. In this case, the voltage of the first common line CT changes in accordance with the result of the exclusive logical sums, and the voltage of the second common line CB changes in accordance with a result that has a complementary relationship with the result of the exclusive logical sums. With this, it is possible to generate the voltage difference between the first common line CT and the second common line CB at an earlier timing, so that the data NEW can be generated earlier. However, in this case, it is conceivable that, after defining a predefined standard voltage, the standard voltage and the voltage of the first common line CT is compared with each other, or the standard voltage and the voltage of the second common line CB is compared with each other. In this case, it becomes possible to delete the circuit shown in FIG. 11 or the circuit shown in FIG. 10, hence the downsizing can be achieved.

<Entire Configuration of Ising Calculator and Semiconductor Integrated Circuit Apparatus>

Figure 14:
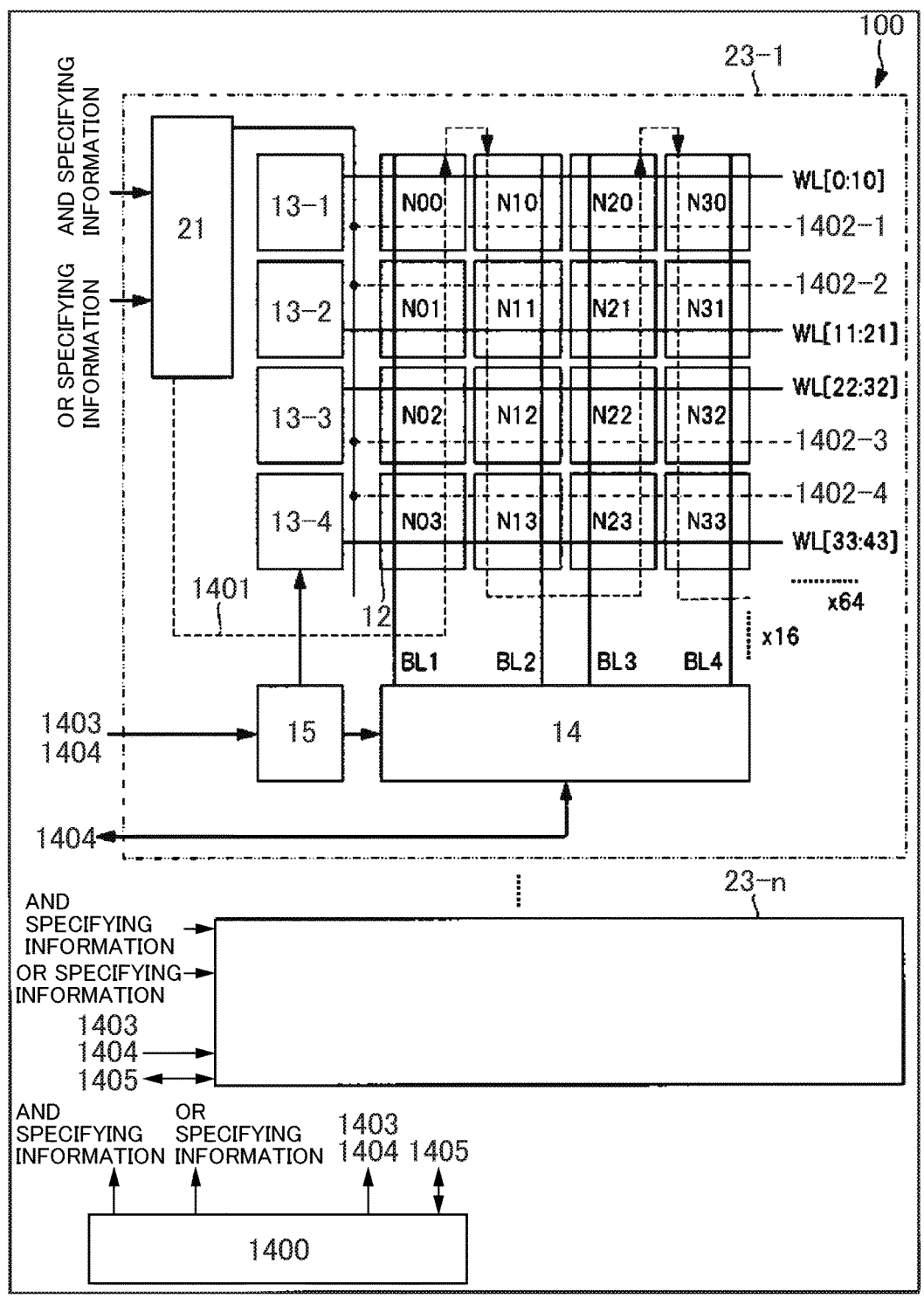
FIG. 14 is a block diagram showing the entire configuration of the Ising calculator and semiconductor integrated circuit apparatuses according to the first embodiment.

FIG. 14 is a block diagram showing the entire configuration of the Ising calculator 100 and semiconductor integrated circuit apparatuses. The Ising calculator 100 includes plural semiconductor integrated circuit apparatuses 23-1 to 23-n and a control device 1400. Because the plural semiconductor integrated circuit apparatuses 23-1 to 23-n have the same configurations, only the configuration of the semiconductor integrated circuit apparatus 23-1 is shown in FIG. 14. The control device 1400 is a device for controlling the semiconductor integrated circuit apparatuses 23-1 to 23-n respectively, and generates an address signal, AND specifying information, and OR specifying information and supplies them to each of the semiconductor integrated circuit apparatuses 23-1 to 23-n. In addition, the control device 1400 transmits data to and receives data from each of the semiconductor integrated circuit apparatuses 23-1 to 23-n, and writes data in and/or read data from each of the semiconductor integrated circuit apparatuses 23-1 to 23-n.

Hereinafter, the configuration of the semiconductor integrated circuit apparatus 23-1 will be explained hereinafter as a representative of the semiconductor integrated circuit apparatuses 23-1 to 23-n. The semiconductor integrated circuit apparatus 23-1 includes plural spin cells 12 disposed in a matrix form. Although the matrix form is not limited to the following matrix form, the spin cells 12 are disposed in a 16×64 matrix in this embodiment, and spin cells 12 disposed in 4×4 matrix form among the spin cells 12 disposed in the 16×64 matrix in FIG. 14 are shown with reference signs N00 to N03, N10 to N13, N20 to N23, and N30 to N33. Here, in the spin cells shown in FIG. 14, the first figure after the sign N represents a column number (the column 0 to the column 3), and the second figure represents a row number (the row 0 to the row 3). In order to make the following explanation easy to understand, the explanation will be made using the spin cells 12 disposed in the 4×4 matrix shown in FIG. 14. However, the configurations and operations of other spin cells are the same. Furthermore, the disposition of these spin cells 12 is depicted in such a way that it is compliant with the actual disposition in a semiconductor integrated circuit apparatus.

Each spin cell 12 has a configuration shown in FIG. 7. First, the correspondence relationship between the spin cell 1 shown in FIG. 7 and a spin cell 12 shown in FIG. 14 will be explained. The following explanation will be made considering an example in which the spin cell 1 shown in FIG. 7 corresponds to a spin cell 12 depicted as N11 in FIG. 14.

In FIG. 14, each of the reference signs BL1 to BL4 depicts a pair of complementary data line, and the pairs of complementary data lines BL1 to BL4 are respectively assigned to the columns of the spin cells 12 disposed in the matrix form, and each of the pairs of complementary data lines BL1 to BL4 is connected with the plural spin cells 12 disposed in the corresponding column. Each of the pairs of complementary data lines BL1 to BL4 includes a pair of complementary data lines, and a pair of complementary data lines included in the pair of complementary data lines BL2 in the spin cell 12 (N11) is shown as the complementary data lines BLT and BLB in FIG. 7. As explained using FIG. 7, the memory cells 9(N, IS0, IS1, IU0, IU1, IL0, IL1, IR0, IR1, ID0, and ID1) are connected with the complementary data lines BLT and BLB.

In FIG. 14, reference signs WL[0:10] to WL[33:43] are respectively word lines, and the word lines are assigned to the rows of the matrix of the spin cells 12 respectively, and each of the word lines is connected with spin cells in the corresponding row. In FIG. 14, a word line [0:10] means word lines WL0 to WL10. In other word, 11 word lines WL0 to WL10 are collectively represented by one word line [0:10]. Each of other word lines WL[11:21] to WL[33:43] also includes 11 word lines, and these are collectively represented by one word line. The spin cell 12 (N11) includes 11 memory cells (N, IS0, IS1, IU0, IU1, IL0, IL1, IR0, IR1, ID0, and ID1) as shown in FIG. 7. Each of word lines WL11 to WL21 included in the word line WL[11:21] is connected with the corresponding memory cell 9.

For example, the word line WL11 is connected with the memory cell 9(N) in FIG. 7. Similarly, the word line WL12 is connected with the memory cell 9(IS0); the word line WL13 with the memory cell 9(IS1); the word line WL14 with the memory cell 9(IU0); the word line WL15 with the memory cell 9(IU1); the word line WL16 with the memory cell 9(IL0); the word line WL17 with the memory cell 9(IL1); the word line WL18 with the memory cell 9(IR0); the word line WL19 with the memory cell 9(IR1); the word line WL20 with the memory cell 9(ID0); and the word line WL21 with the memory cell 9(ID1) (Refer to FIG. 7 and FIG. 14).

When the memory cell 9(N) is taken for example, as shown in FIG. 8, the word line WL (WL11) is connected with the gates of N-type MOSFETs for transfer TRT and TRB, and the complementary data lines BLT and BLB are connected with an inverter circuit, which is connected crosswise, via N-type MOSFETs for transfer TRT and TRB respectively. Similarly, in the other memory cells 9(IS0, IS1, IU0, IU1, IL0, IL1, IR0, IR1, ID0, and ID1), the word lines WL12 to WL20 are connected with the gates of N-type MOSFETs for transfer respectively, and complementary data lines BLT and BLB are connected with inverter circuits, which are connected crosswise, via N-type MOSFETs for transfer respectively. Here, the second write path, which has been explained in FIG. 8, is not implemented in each of the other memory cells 9(IS0, IS1, IU0, IU1, IL0, IL1, IR0, IR1, ID0, and ID1).

In FIG. 14, the reference sign 1401 depicts modifying data. In this embodiment, the modifying data 1401 is supplied in the direction from the spin cell 12 (N03), which is disposed in the column 0 of the matrix, to the spin cell 12 (N00), which is also disposed in the same column 0. Next, the modifying data 1401 is supplied to the spin cells 12 (N10 to N13) in the column 1. In other words, the modifying data 1401 is sequentially supplied to the spin cells 12 disposed in the different columns as if the modifying data 1401 were supplied along a continuous line drawn with a single stroke of the brash. In the spin cell 12 (N11), the modifying data 1401 from the spin cell 12 (N10) is input into the memory circuit 4 and the adjusting circuit 8 shown in FIG. 7, and the modifying data 1401 output from the adjusting circuit 8 is supplied to the spin cell 12 (N12) shown in FIG. 14. Therefore, the adjacent spin cell written in the phase "FROM ADJACENT SPIN CELL" in FIG. 7 corresponds to the spin cell 12 (N10) in the example shown in FIG. 14. In addition, the adjacent spin cell written in the phase "TO ADJACENT SPIN CELL" in FIG. 7 corresponds to the spin cell 12 (N12) in FIG. 14.

Hereinafter, examples of the spin cells, which are disposed in the vicinity of the relevant spin cell and explained in FIG. 7, will be described. As described using FIG. 7, interaction coefficients used for computing influences exerted by spin cells disposed in the vicinity of the spin cell 12 (N11) on this spin cell 12 (N11) are respectively stored in the memory cells IU0, IU1, IL0, IL1, IR0, IR1, ID0, and ID1. In the example shown in FIG. 14, the spin cells disposed in the vicinity of the spin cell 12 (N11) correspond to the spin cell 12 (N10), the spin cell 12 (N01), the spin cell 12 (N21), and the spin cell 12 (N12). In this case, the spin cell 12 (N10) corresponds to a spin cell disposed on the upside of the spin cell, the spin cell 12 (N01) corresponds to a spin cell disposed on the left side, the spin cell 12 (N21) corresponds to a spin cell disposed on the right side, and the spin cell 12 (N12) corresponds to a spin cell disposed on the downside.

Therefore, interaction coefficients between the spin cell 12 (N11) and the spin cell 12 (N10) are written in the memory cells IU0 and IU1, interaction coefficients between the spin cell 12 (N11) and the spin cell 12 (N01) are written in the memory cells IL0 and IL1, interaction coefficients between the spin cell 12 (N11) and the spin cell 12 (N21) are written in the memory cells IR0 and IR1, and interaction coefficients between the spin cell 12 (N11) and the spin cell 12 (N12) are written in the memory cells ID0 and ID1. Furthermore, the spin value NU described in FIG. 7 is supplied from the spin cell 12 (N10), the spin value NL is supplied from the spin cell 12 (N01), the spin value NR is supplied from the spin cell 12 (N21), and the spin value ND is supplied from the spin cell 12 (N12).

In addition, the spin value held in the memory cell N shown in FIG. 7 is supplied to the spin cell 12 (N12) as the value NU, to the spin cell 12 (N21) as the value NL, to the spin cell 12 (N01) as the value NR, and to the spin cell 12 (N10) as the value ND. The same can be said for any other spin cell. In the relevant spin cell, interaction coefficients between the relevant spin cell and spin cells disposed in the vicinity of the spin cell are written in memory cells, and spin values from the spin cells disposed in the vicinity are supplied. Furthermore, the spin cell supplies the spin value of its own to the spin cells disposed in the vicinity.

Coming back to FIG. 14 to continue the explanation, in FIG. 14, the reference signs 1402-1 to 1402-4 depict selection lines respectively. In this embodiment, the selection lines 1402-1 to 1402-4 are assigned to the rows (the row 0 to the row 4) of the matrix of the spin cells respectively, and each of the selection lines are connected with the spin cells 12 disposed in the corresponding row. In the example of the spin cell 12 (N11), the selection line 1402-2 is connected with the adjusting circuit 8 shown in FIG. 7, and supplies the selection signal SELi(SEL2) to the adjusting circuit 8.

In FIG. 14, the reference sign 15 depicts a control circuit including an address decoder, and the control circuit 15 decodes an address signal 1403 supplied from the control device 1400, and supplies the decoded result to word line drive circuits 13-1 to 13-4 and a column circuit 14. In addition, the control circuit 15 receives a control signal 1404 including a write enable signal that controls read from/write to a spin cell, and supplies the enable signal that controls read/write to the column circuit 14.

When reading from or writing to a memory cell 9 included in a spin cell 12 is executed, the control circuit 15 decodes the address signal 1403, and supplies the decoded result to the word line drive circuits 13-1 to 13-4 and the column circuit 14. The word line drive circuits 13-1 to 13-4 set one word line among the plural word lines WL0 to WL43 high-level and set the remaining word lines low-level in accordance with the supplied decoded result. With this, one row is selected from the matrix of the spin cells 12, and further one memory cell is selected from each of plural spin cells disposed in the selected row. In the selected memory cells, inverter circuits that are connected crosswise are connected with the pairs of the complementary data lines BL1 to BL4 respectively.

The column circuit 14 selects a pair of the complementary data lines among the pairs of the complementary lines BL1 to BL4 in accordance with the supplied decoded data. Furthermore, in the case where the supplied enable signal directs that reading should be executed, the column circuit 14 amplifies the voltage difference between the selected complementary data lines, and outputs the amplified voltage difference as read data. On the other hand, in the case where the supplied enable signal directs that writing should be executed, the column circuit 14 supplies a signal corresponding to the supplied write data to the selected pair of complementary data lines. With this, writing data in and reading data from the memory cell 9 in the spin cell 12 specified by the address signal are executed. Here, write data or read data is depicted by the reference sign 1405 in FIG. 14.

In FIG. 14, the reference sign 21 denotes the control circuit shown in FIG. 5. The control circuit 21 receives the AND specifying information and the OR specifying information, and supplies a selection signal SELi to the selection line 1402-1 to the selection line 1402-4. As explained in FIG. 5, the selection signal SELi is generated on the basis of the AND specifying information and the OR specifying information. An adjusting circuit 8 in each of the spin cells 12 selects the output of the AND circuit 6, the output of the OR circuit 7, or "THROUGH" in accordance with the selection signal SELi, and supplies the selected output or the output of the memory cell 4 of the relevant spin cell 12 to the memory circuit 4 of an adjacent spin cell 12.

The control device 1400 supplies the address signal 1403 and the control signal 1404 to each of the semiconductor integrated circuit apparatuses 23-1 to 23-n in accordance with a user's directions. In addition, the control device 1400 supplies write data to and receives read data from each of the semiconductor integrated circuit apparatuses 23-1 to 23-n. Furthermore, the control circuit 1400 generates the AND specifying information and the OR specifying information, and supplies these pieces of information to each of the semiconductor integrated circuit apparatuses 23-1 to 23-n.

In the case of taking the case where spin values, external magnetic field coefficients, and interaction coefficients are written in or read from the eleven memory cells 12 (N, IS0, IS1, IU0, IU1, IL0, IL1, IR0, IR1, ID0, ID1) in the spin cell 12 (N11) as an example, the following explanation will be made.

First, in the case of writing, the control device 1400 supplies an enable signal that directs that writing should be executed, an address signal that specifies a memory cell in the spin cell 12 (N11), and data to be written to the semiconductor integrated circuit apparatus 23-1. In the semiconductor integrated circuit apparatus 23-1, a word line WL (for example, WL11) of the word line WL[11:21] is set to high-level and the remaining word lines are set to low-level in accordance with the supplied address signal. In addition, a pair of complementary data lines BL2 is selected in accordance with the supplied address signal, and a signal corresponding to data to be written is supplied to the selected pair of complementary data lines BL2 (the complementary data lines BLT and BLB shown in FIG. 8). With this, the data is written in the memory cell 9 in the spin cell 12 (N11).

Next, in the case of reading, the control device 1400 supplies an enable signal that directs that reading should be executed, an address signal that specifies a memory cell in the spin cell 12 (N11) to the semiconductor integrated circuit apparatus 23-1. In the semiconductor integrated circuit apparatus 23-1, a word line WL (for example, WL11) of the word line WL[11:21] is set to high-level and the remaining word lines are set to low-level in accordance with the supplied address signal.

In addition, a pair of complementary data line BL2 is selected in accordance with the supplied address signal, and the voltage difference between the selected pair of complementary data lines BL2, the amplified voltage difference is supplied to the control device 1400 by the semiconductor integrated circuit apparatus 23-1. In such a way, data is read from the memory cell 9 in the spin cell 12 (N11).

A memory cell in which data is written or from which data is read is selected out of the eleven memory cells 9(N, IS0, IS1, IU0, IU1, IL0, IL1, IR0, IR1, ID0, and ID1) in the spin cell. Therefore, if the memory cell 9(N) is a target memory cell, the spin value of the spin cell 12 (N11) is written in or read from the memory cell 9(N). Furthermore, if the memory cells 9 (IS0 and IS1) are target memory cells, it becomes possible that external magnetic field coefficients are written in the memory cells 9(IS0 and IS1). In addition, if the memory cells 9(IU0, IU1, IL0, IL1, IR0, IR1, ID0, and ID1) are selected as targets memory cells, interaction coefficients can be written in the memory cells 9(IU0, IU1, IL0, IL1, IR0, IR1, ID0, and ID1) respectively.

Of course it is possible to read stored external magnetic field coefficients and/or stored interaction coefficients if needed. Here, because there exist plural external magnetic field coefficients and plural interaction coefficients, these coefficients are written or read in series in terms of time.

<Control Flowchart>

Figure 15:
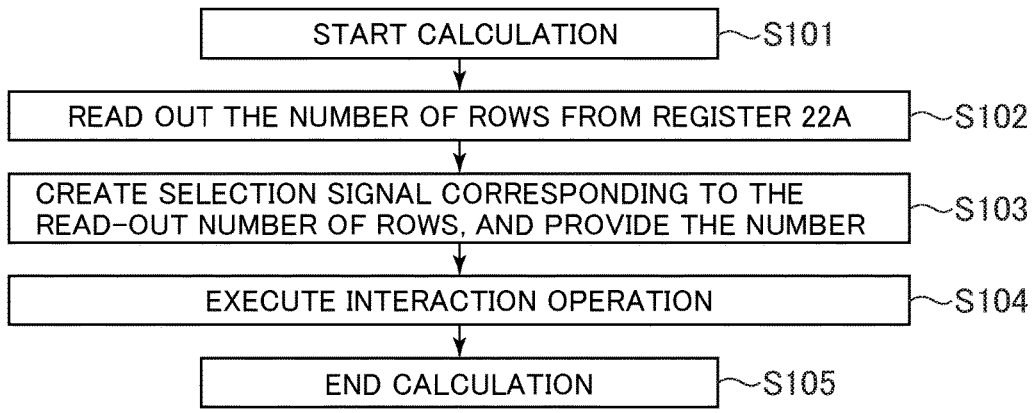
FIG. 15 is a flowchart showing the control of the modification of the occurrence ratios of binary signals "1" and "0".
Figure 16:
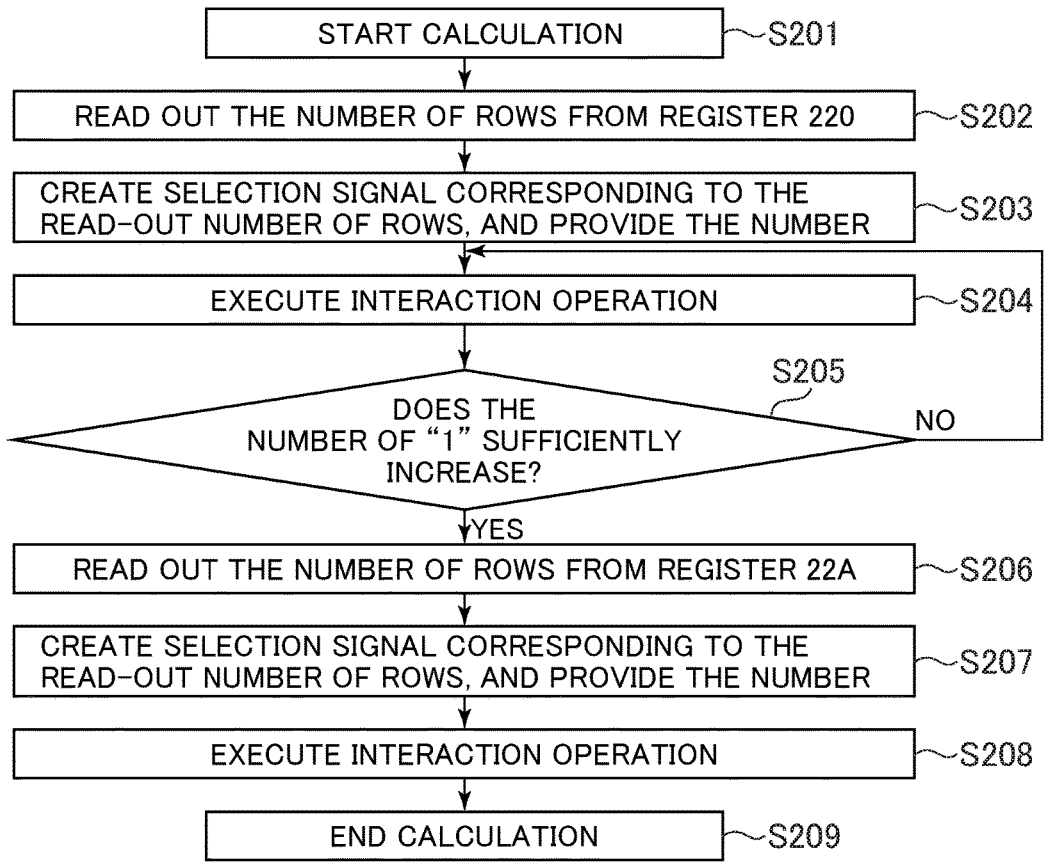
FIG. 16 is a flowchart showing the control of the modification of the occurrence ratios of binary signals "1" and "2".

FIG. 15 and FIG. 16 are flowcharts showing controls for changing the occurrence ratios of the logical values "1" and "0" included in modifying data. A memory circuit 4 included in each spin cell 12 (spin cell 1 in FIG. 5 and FIG. 7) is connected with a memory circuit 4 included in an adjacent spin cell 12 via an adjusting circuit 8, and the output of the adjusting circuit 8 is written in the memory circuit 4 included in the adjacent spin cell 8. In this way, the respective memory circuits 4 are connected with memory circuits 4 included in adjacent spin cells in series via adjusting circuits respectively, hence a shift register is formed by these memory cells. On the other hand, the logical value of data (bit) stored in a memory circuit 4 in a spin cell 12 is used for deciding whether the result of the interaction computing is used as it is or the result of the interaction computing is used after being changed (inverted) as a spin value to be stored in the memory cell 9(N). By changing the occurrence ratio of the logical value "1" or the logical value "0" included in modifying data stored in the shift register formed by the plural memory circuits 4, the spin values held by the spin cells 12 can be changed, hence it becomes possible to prevent the computing from being stuck at the state of a local solution in the processing of an Ising calculation.

In this embodiment, as shown in FIG. 4 or FIG. 6 as an example, the occurrence ratio of the logical value "1" in data (modifying data) stored in the register formed by the memory circuits 4 is modified with the elapse of time.

FIG. 15 is a flowchart showing control for changing the occurrence ratio of the logical value "1" as shown in FIG. 4.

First, an Ising calculation is started using the Ising calculator 100 at step S101. At the start of the computing, spin values, external magnetic field coefficients, and interaction coefficients have been stored in plural memory cells 9 in respective spin cells 12 by the control device 1400 (Refer to FIG. 14). Furthermore, the control device 1400 supplies in advance AND specifying information and/or OR specifying information to the respective semiconductor integrated circuit apparatuses 23-1 to 23-n, and the respective semiconductor integrated circuit apparatuses 23-1 to 23-n store the supplied AND specifying information and/or OR specifying information in the relevant ratio registers 22A and 220 respectively. As shown in FIG. 4, in order to decrease the ratio of the logical value "1" with the lapse of time, the control device 1400 supplies the number of predefined rows to the respective semiconductor integrated circuit apparatuses 23-1 to 23-n using the AND specifying information. Each of the respective semiconductor integrated circuit apparatuses 23-1 to 23-n stores the supplied number of predefined rows in the relevant ratio register 22A.

In addition, a control circuit 21 of each of the semiconductor integrated circuit apparatuses 23-1 to 23-n makes a shift register formed by plural memory circuits 4 execute a shift operation, and supplies modifying data to this shift register. The supplied modifying data is initial modifying data, and this modifying data is a bit sequence including logical values "1" and logical values "0". This initial modifying data is supplied to the shift register, and is sequentially shifted so that this modifying data is stored in the respective stages of the shift register. With this, the logical value "1" or the logical value "0" in the initial modifying is stored in a memory circuit 4 of each spin cell 12. When the initial modifying data is stored in the shift register, the shift register formed by memory circuits 4 is made to execute a shift operation as a shift register. In this case, an adjusting circuit 8 in each spin cell 12 is controlled so that the output of the relevant memory circuit 4 is through (the second mode). With this, bits in the initial modifying data are sequentially supplied to the memory circuits 4 of the spin cells 12.

Next, the control circuit 21 reads the number of rows stored in the ratio register 22A at step S102. In this case, because the number of rows is read from the ratio register 22A, the number of rows is judged to be the number of rows used for selecting the outputs of AND circuits 6, and the control circuit 21 generates a selection signal for selecting the outputs of AND circuits in adjusting circuits 8, and outputs the selection signal to the selection lines 1402-1 to 1402-n. At this time, the number of selection lines that supply the selection signal is made to be equal to the number of rows read from the ratio register 22A (at step S103).

After step S103, an interaction operation is executed for a predefined time at step S104, and the calculation is ended at step S105.

In the interaction operation executed at step S104, the computing of interactions explained in FIG. 7 is executed. In other words, logical computing is executed using a spin value from an adjacent spin cell, interaction coefficients, and external magnetic field coefficients, and a logical value based on the logical computing is stored in the memory cell 9(N) as a spin value. This operation is repeated predefined times. In this repeated operation, the logical value of the result of the logical computing is inverted or not inverted in accordance with the logical value of the modifying data stored in the memory circuit 4, and stored in the memory cell 9(N) as a logical value based on the result of the logical computing.

In each of predefined rows, which are specified by the AND specifying information, an adjusting circuit 8 executes AND computing of a logical value stored in a memory circuit 4 and a logical value stored in a memory circuit 4 installed in an adjacent spin cell at the previous stage, and writes the computed result in a memory circuit 4 installed in an adjacent spin cell at the next stage. As a result, the number of the logical values "1" included in the initial modifying data stored in the register formed by the memory circuits 4 is decreased with the elapse of time. In other words, as shown in FIG. 4, the ratio of the logical value "1" that occurs in the initial modifying data is gradually decreased from 0.5 with the elapse of time.

FIG. 4 shows that, because the ratio of the logical value "1" included in the modifying data is decreased, the number of logical values that are obtained by inverting the results of logical computing operations and stored in memory cells 9(N) as spin values decreases with the elapse of time.

FIG. 16 shows a flowchart showing the control of the modification of the occurrence ratio of the binary signal "1".

First, the computing is started at step S201. At the start of the computing, as mentioned at step S101 in FIG. 15, spin values, external magnetic field coefficients, and interaction coefficients are stored in respective spin cells 12. Furthermore, the shift register formed by plural memory circuits 4 is made to execute a shift operation to store initial modifying data in itself. In addition, the number of rows specified by the OR specifying information is stored in the ratio register 220.

The control circuit 21 reads the number of rows stored in the ratio register 220 at step S202. Because the number of rows is read from the ratio register 220, the control circuit 21 generates a selection signal that makes adjusting circuits 8 in the respective spin cells 12 select the outputs of AND circuits, and supplies the selection signal to selection lines corresponding to the read-out number of rows (at step S203).

Next, at the next step S203, an interaction operation is executed for a predefined time. This interaction operation is similar to the interaction operation described in FIG. 15. In other words, this interaction computing operation is repeated for the predefined time. In the repeated computing operation, logical values based on the computing results are stored in the memory cells 9(N). When the logical values are stored, the computing results are inverted or not inverted in accordance with the logical values of the modifying data stored in the memory circuits 4, and then the inverted computing results or noninverted computing results are stored. Because the outputs of the AND circuits 6 are selected in FIG. 15, the number of "1" in the logical values of the modifying data stored in the memory circuits 4 is decreased with the elapse of time at step 104.

On the contrary, at step S204, in each of predefined rows, which are specified by the OR specifying information, an adjusting circuit 8 executes OR computing of a logical value stored in a memory circuit 4 and a logical value stored in a memory circuit 4 installed in an adjacent spin cell at the previous stage, and writes the computed result in a memory circuit 4 installed in an adjacent spin cell at the next stage. As a result, the number of the logical values "1" is increased with the elapse of time in comparison with the initial modifying data stored in the register formed by the memory circuits 4. In other words, as shown in FIG. 6, the ratio of the logical value "1" that occurs in the initial modifying data is gradually increased from 0.5 with the elapse of time (during a time period of "OR being selected").

Because the number of logical values "1" in the modifying data stored in the register is increased, the number of spin cells that store the inverted logical values, which are obtained by inverting the results of logical computing operations, as spin values is increased.

After the predefined time elapses, step S205 is executed. At step S205, it is judged whether or not the number of logical values "1" in the modifying data stored in the register, which is formed by the memory circuits 4, has been sufficiently increased. In this embodiment, the control device 1400 makes this judgment at step S205, although this is not the only method. The control device 1400 directs each of the semiconductor integrated circuit apparatuses 23-1 to 23-$n$ to make the relevant shift register formed by memory circuits 4 execute a shift operation. By making the shift register execute the shift operation, the control device 1400 receives the stored modifying data via the control circuit 21. The control device 1400 executes step S205 by judging the number of logical values "1" included in the received modifying data. In this case, after supplying the modifying data to the control device 1400, the control circuit 21 gets the modifying data back in the shift register again to return this processing in the state before the processing of step S205 is started, and further makes the memory circuits 4 form the shift register.

It is also possible to read the modifying data stored in the memory circuits 4 without making the shift register formed by the memory circuits 4 execute a shift operation as mentioned above. For example, it is conceivable that, after the memory circuits 4 are connected with word lines and pairs of complementary data lines, the memory circuits 4 is selected using address signals as is the case with the memory cells 9(N), and the modifying data is read via the pairs of complementary data lines.

If it is judged that the number of logical values "1" in the modifying data has not been sufficiently increased, step S204 is executed again. With this, in the processing of the interaction computing operation, the number of logical values "1" included in the modifying data is increased. Here, the judgment whether the number of logical values "1" has been sufficiently increased or not can be determined by judging whether or not the number of logical values "1" is larger than a predefined value.

At step S205, if the control device 1400 judges that the number of logical values "1" stored in the modifying data has been sufficiently increased, the control device 1400 supplies AND specifying information that specifies the number of predefined rows to the ratio registers 22A of the semiconductor integrated circuit apparatuses 23-1 to 23-$n$. A control circuit 21 in each semiconductor integrated circuit apparatus reads the number of rows stored in the relevant ratio register 22A at step S206. Next, the control circuit 21 generates a selection signal, which is used in order for the output of an AND circuit 6 to be selected, and supplies the selection signal to selection lines corresponding to the read-out number of rows (at step S207). Subsequently, the interaction operation is executed for a predefined time at step S208, and the calculation is ended at step S209. Steps at S206 to S209 are similar to steps S102 to S105 shown in FIG. 15, so that the detailed explanation thereof is omitted.

Here, the control circuit 21 continues supplying the selection signal to the selection lines during a time period for step S104 being executed shown in FIG. 15 and a time period for steps S204 to S208 being executed shown in FIG. 16.

Furthermore, when the control circuit 21 executes step S203 and S204, the control circuit 21 generates a selection signal corresponding to the number of rows read from the ratio register 22A, and continues supplying the selection signal, and when the control circuit 21 executes step S207 and S208, the control circuit 21 generates a selection signal corresponding to the number of rows read from the ratio register 220, and continues supplying the selection signal, although this is not the only method. In other words, in this embodiment, the operation of selecting selection lines in accordance with the number of rows read from the ratio register 22A and the operation of selecting selection lines in accordance with the number of rows read from the ratio register 220 do not overlap each other in terms of time.

By executing the control shown in FIG. 16, the number of logical values "1" in the modifying data increases during the time period of "OR being selected" as shown in FIG. 6. If the number of logical values "1" has been sufficiently increased, the number of logical values "1" that exists in the modifying data is decreased as described using FIG. 15 (during the time period of "AND being selected").

With this, in the result of the interaction logical computing, the number of logical values that are written in the memory cells 9 (N) after being inverted as spin values is increased in the early stage of the computing, and afterward the number of logical values that are written in the memory cells 9(N) after being inverted as spin values is decreased.

<Example of Occurrence Ratio Modification>

Memory circuits 4 (Refer to FIG. 7) in the respective spin cells shown in FIG. 14 are connected in series with each other via adjusting circuits 8 (Refer to FIG. 7), and form a shift register. As described in FIG. 5 and FIG. 7, the adjusting circuit 8 selects any of the output of the AND circuit 6, the output of the OR circuit, and "THROUGH" in accordance with AND specifying information and OR specifying information generated by the control device 1400 shown in FIG. 14, and writes the selected output or "THROUGH" to the memory circuit of an adjacent spin cell 12. Therefore, by modifying the AND specifying information and/or OR specifying information generated by the control 1400, the occurrence ratio of the predefined logical value ("1" or "0") included in the register can be modified. Hereinafter, an example of a modification of the occurrence ratio will be further explained.

Figure 17:
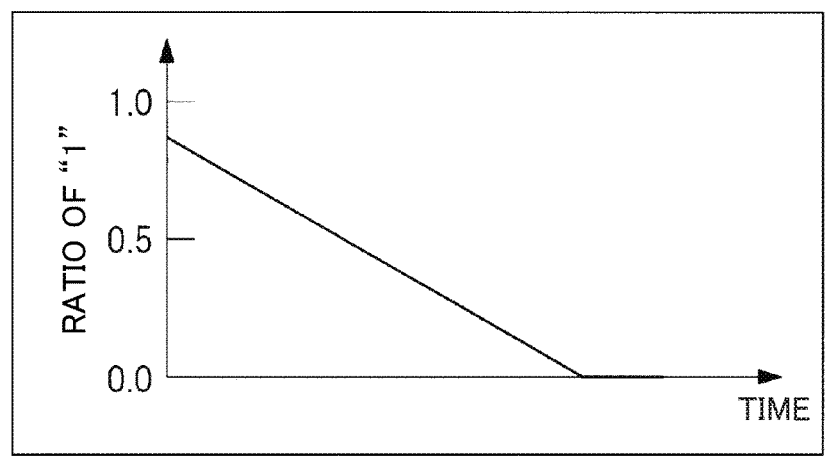
FIGS. 17(A) and (B) are diagrams showing the occurrence ratios of the predefined logical value (the binary signal "1").
Figure 17:
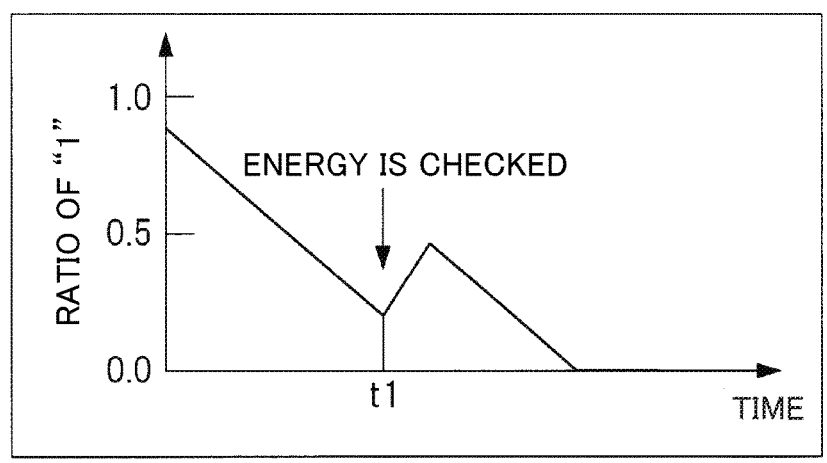

FIG. 17(A) and FIG. 17(B) are diagrams showing examples of modifications of the logical value "1" as a predefined logical value. In FIG. 17(A) and FIG. 17(B), the horizontal axis represents time and the vertical axis represents the ratio of the logical value "1".

In FIG. 17(A), the ratio of the logical value "1" is set about 0.8 at the start of an Ising calculation. Adjusting circuits 8 in plural spin cells 12 disposed in rows the number of which has been specified in accordance with AND specifying information are made to select the outputs of the relevant AND circuits 6 respectively. With this, modifying data held in the register is decreased with the elapse of time as the Ising calculation proceeds. A logical value of a bit of the modifying data supplied to an adjusting circuit 8, which selects the output of the relevant AND circuit 6, is modified so that it becomes equal to the logical value of the output of the AND circuit 6, and this modified logical value is written in the memory circuit 4 in the adjacent spin cell. This modification and the write operation are repeated with the elapse of time. Therefore, the number of logical values "1" included in the shift register is decreased with the elapse of time. As a result, as shown in FIG. 17(A), the ratio of the logical value "1" included in the shift register is decreased with the elapse of time. Owing to the decrease of the ratio of the logical value "1", the probability that results obtained by interaction computing operations are not inverted and are stored as they are as spin values becomes higher with the elapse of time. With this, it becomes possible to prevent the Ising calculation from being stuck at a local solution.

FIG. 17(B) shows the variation of the ratio of the logical value "1" in the case where adjusting circuits 8 disposed in rows number of which has been predefined in accordance with the AND specifying information are made to select the outputs of the relevant AND circuits 6 respectively at the early stage of an Ising calculation, and afterward adjusting circuits 8 disposed in rows number of which has been predefined in accordance with the OR specifying information are made to select the outputs of the relevant OR circuits 7 respectively. In this case, the ratio of the logical value "1" is also set about 0.8 at the start of the Ising calculation. The adjusting circuits 8 in spin cells in the predefined rows in accordance with the AND specifying information are made to select the outputs of the relevant AND circuits 6 respectively in the early stage of the Ising calculation. A logical value of a bit of the modifying data supplied to an adjusting circuit 8, which selects the output of the relevant AND circuit 6, is modified so that it becomes equal to the logical value of the output of the AND circuit 6, and this modified logical value is written in the memory circuit 4 in the next stage of the shift register. This operation is repeated with the elapse of time, and the number of logical values of "1" included in the modifying data in the shift register is gradually decreased.

At the time t1, the control device 1400 reads spin values from memory cells 9(N) in spin cells 12 included in the semiconductor integrated circuit apparatus 23-1. In this case, spin values from the memory cells 9(N) in all the spin cells 12 included in the semiconductor integrated circuit apparatus 23-1 are read out, although this is not inevitable. The control device 1400 executes the computing of the above mentioned Expression (1) to obtain Energy E using the read-out spin values. In this case, because interaction coefficients and external magnetic field coefficients have been written in the respective memory cells in advance by the control device 1400, the computing of Expression (1) can be executed using the written interaction coefficients and external magnetic field coefficients. Therefore it is not necessary to read out the interaction coefficients and external magnetic field coefficients at the time t1, which makes it possible to speed up the computing of Expression (1).

Whether or not the energy E obtained at the time t1 is decreased to a predefined value is judged. If the energy E is not decreased to the predefined value, adjusting circuits 8 in spin cells 12 disposed in rows the number of which has been specified in accordance with OR specifying information are made to select the outputs of the relevant OR circuits 7 respectively. With this, modifying data held in the register is modified with the elapse of time. In other words, a logical value of a bit of the modifying data supplied to an adjusting circuit 8, which selects the output of the relevant OR circuit 7, is changed into the logical value of the output of the OR circuit 7, and this modified logical value is written in the memory circuit 4 in the adjacent spin cell. Changing the logical values of the modifying data into the logical values of the outputs of OR circuits 7 and writing the changed logical values in the memory circuits 4 are repeated with the elapse of time. Therefore, the number of logical values "1" included in the modifying data is increased with the lapse of time. In other words, the ratio of the logical value "1" is increased.

At the time when the ratio of the logical value "1" is increased to a predefined value (for example, about 0.5), adjusting circuits 8 in spin cells disposed in rows the number of which has been specified in accordance with the AND specifying information are made to select the outputs of the relevant AND circuits 6 respectively. With this, the ratio of the logical value "1" is again decreased with the elapse of time.

On the other hand, if the obtained energy is decreased to the predefined value, the outputs of the AND circuits 6 is made to be continuously selected in accordance with the AND specifying information. In this case, the ratio of the logical value "1" changes in a similar way to the ratio shown in FIG. 17(A).

As described above, checking the energy E in the processing of the Ising calculation makes it possible to increase the number of times the spin values are changed when the energy E is not decreased to the predefined value and is stuck at a local solution, with the result that the energy E can get away from a local solution.

In this embodiment, the logical values used for deciding whether or not the results of interaction computing operations, which are stored as spin values, are changed are stored respectively in memory circuits 4. A shift register is formed by these memory circuits 4, and a bit sequence of logical values that are used for deciding whether or not the results of interaction computing operations are changed is supplied to the shift register. Therefore, supplying an arbitrary bit sequence as modifying data makes it possible that arbitrary logical values are supplied to the respective memory circuits 4 that form the shift register. With this, the spin values used for interaction computing operations can be changed to arbitrary logical values, hence a possibility that the computing of the energy E falls into a local solution can be lowered. In addition, because the possibility that the computing of the energy E falls into a local solution can be lowered using inversion logic circuits LG that change the logical values of the results of interaction computing operations and memory circuits 4, the increase of the circuit scale can be suppressed.

Furthermore, in this embodiment, it is possible to change logical values written in the memory circuits 4, which form the shift register, to the outputs of the AND circuits 6, the outputs of the OR circuits 7, and the like. With this, the occurrence ratio of a predefined logical value in the register formed by the memory circuits 4 can be adjusted. Because the occurrence ratio of the predefined logical value can be adjusted, the probability that the computing of the energy E falls into a local solution can be decreased while suppressing the increase of the circuit scale.

Second Embodiment

Figure 18:
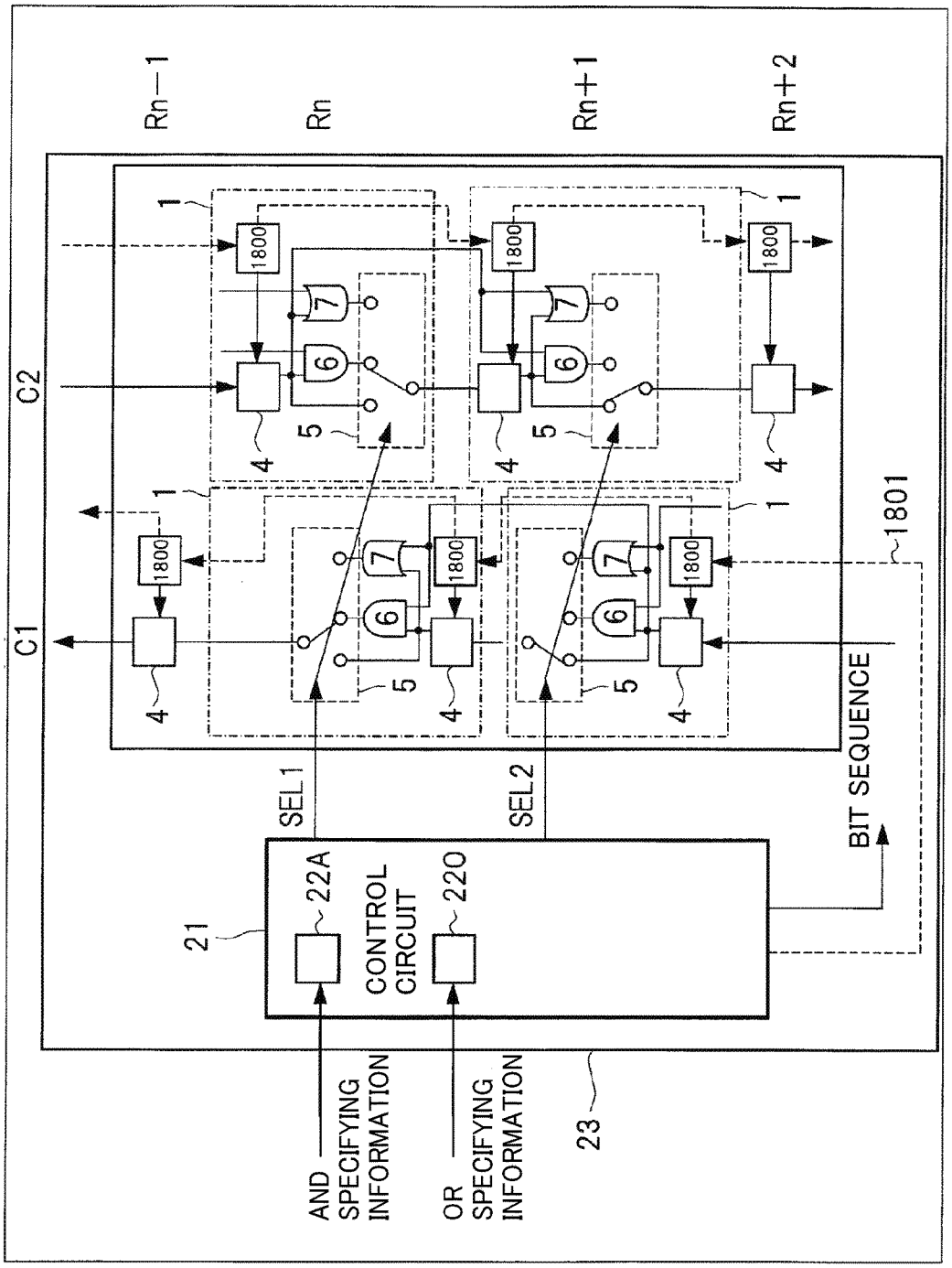
FIG. 18 is a block diagram showing the configuration of a semiconductor integrated circuit apparatus according to a second embodiment.

FIG. 18 is a block diagram showing the configuration of a semiconductor integrated circuit apparatus 23 according to a second embodiment. The configuration of the semiconductor integrated circuit apparatus 23 shown in FIG. 18 is similar to the configuration of the semiconductor integrated circuit apparatus shown in FIG. 5. Therefore, main different points will be explained hereinafter.

In comparison with the semiconductor integrated circuit apparatus shown in FIG. 5, a memory circuit 1800 (an initial value memory circuit) is added to each spin cell 1 in the semiconductor integrated circuit apparatus 23 according to the second embodiment. In this second embodiment, memory circuits 1800 in the respective spin cells 1 are connected with each other as shown in dashed lines, and these memory circuits 1800 form a shift register. The relevant control circuit 21 supplies initial modifying data 1801 as a bit sequence to the shift register formed by the plural memory circuits 1800 connected in series.

The control circuit 21 supplies the initial modifying data to the shift register formed by the memory circuits 1800, and makes the shift register execute a shift operation. With this, the initial values (several bits) are stored in the respective memory circuits 1800. In this embodiment, the initial modifying data supplied to the shift register formed by the memory circuits 1800 and initial modifying data (a bit sequence) supplied to a shift register formed by the memory circuits 4 are set equal to each other. In addition, memory circuits 4 and memory circuit 1800 implemented in the same spin cell 1 are configured in such a way that the logical values stored in the memory circuits 1800 can be supplied to and written in the memory circuits 4 respectively.

As described in the first embodiment, the output of an adjusting circuit 8 (formed by a selection switch, an AND circuit 6, and an OR circuit 7) in the adjacent spin cell 1 is supplied to and written in the relevant memory cell 4. With this, the modifying data stored in the shift register formed by the memory cells 4 is modified using the initial modifying data. In other words, the pattern of the bit sequence composed of the logical values "1" and the logical vales "0" in the modifying data is modified with the elapse of time. For this reason, it is conceivable that there arises an imbalance between the number of logical values "1" and the number of logical values "0" in the modifying data stored in the shift register formed by the memory circuits 4, and it becomes difficult to adjust the imbalance even using the AND circuit 6 and/or OR circuit 7 implemented in the adjusting circuit 8. For example, in the case where the number of logical values "1" stored in the shift register formed by the memory circuits 4 is extremely increased, it becomes difficult to decrease the number of logical values "1" even using the AND circuit 6. Similarly, in the case where the number of logical values "0" is extremely increased, it becomes difficult to decrease the number of logical values "0" using the OR circuit 7.

In such cases as above, it becomes possible to bring the modifying data stored in the memory circuits 4 into the original modifying data by supplying the initial modifying data stored in the memory circuits 1800 to the memory circuits 4. In other words, the initial modifying data held by the shift register formed by the memory circuits 1800 is written in the shift register formed by the memory circuits 4. With the use of the abovementioned procedure, an operation, in which the initial modifying data is generated again, and the generated initial data is supplied to and written in the shift register formed by the memory circuits 4, can be spared.

Although the initial modifying data supplied to the shift register formed by the memory circuits 4 is also shown as a bit sequence, if the initial modifying data 1801 and this bit sequence is the same, it is conceivable that either this bit sequence or the initial modifying data 1801 is generated and the generated bit sequence or the generated initial modifying data is supplied to both registers.

A memory circuit such as an SRAM or the like holds the logical value "1" or the logical value "0" randomly when a power supply voltage Vd is supplied to the relevant semiconductor integrated circuit 23 owing to the variations of the characteristics of P-type MOSFETs and/or N-type MOSFETs that form the memory circuit. Using this, initial modifying data can be generated. In the case where SRAMs are used as the respective memory circuits 1800 for example, logical values held by the respective memory circuits 1800 when the power supply voltage Vd is supplied to the respective memory circuits 1800 are used for initial modifying data. In this case, it is not necessary for the control device 21 to generate initial modifying data. In other words, when the power supply voltage Vd is supplied, a bit sequence stored in the shift register formed by the memory circuits 1800 is treated as initial modifying data, and the initial modifying data stored in this shift register is written in the shift register formed by the memory circuits 4. With this, the initial modifying data is stored in the shift register formed by the memory circuits 4, too.

In the first and second embodiments, a register formed by plural memory circuits 4 connected in series is referred to as a shift register. In a well-known register, data is sequentially shifted, for example, from a memory circuit in the previous memory circuit to a memory circuit in the subsequent stage, and data is written in the memory circuit in the subsequent stage. Because the data is shifted, it is natural that specific data or new data should be written in a memory circuit in the first stage. In the register described in the first and second embodiments, when a shift operation is executed, data is not supplied to the memory circuit of the first stage, that is, new data is not written in the memory circuit of the first stage, and the logical value of the initial modifying data for the memory circuit of the first stage is kept as it is. Furthermore, although the first and second embodiments have been described in such a way that the outputs of the adjusting circuits 8 are configured to be sequentially written in the relevant memory circuits 4 respectively, it is also conceivable that the memory circuits 4 bring in the outputs from the adjusting circuits 8 respectively, and write the outputs in themselves in response to the voltage variation of the clock signal CLKI. In other words, the shift register can execute a shift operation in synchronization of the clock CLKI. In the first and second embodiments, when the modifying data is changed in order to modify the occurrence ratio of the predefined logical value ("1"), it is not necessary that the control circuit 21 should generate new modifying data (modifying data obtained after changing) and supply the new modifying data to the register formed by the memory circuits 4. With this, the configuration of the control circuit 21 can be simplified. In addition, because it is not necessary that the control circuit 21 should generates new modifying data, a time needed for generating the new modifying data can be spared.

Although the present invention that is achieved by inventors has been concretely explained on the basis of some embodiments of the invention above, the present invention is not limited by these embodiments, and it goes without saying that the present invention can be modified in various ways as far as within the gist of the present invention. For example, the above-described embodiments have been described in detail in order to make the present invention easy to understand, and therefore all the components described so far are not always indispensable for the present invention. Furthermore, the predefined logical value can be either the binary signal "1" or the binary signal "0". In addition, a part of the configuration of one embodiment can be replaced with a part of configuration of another embodiment, or one embodiment may be made by adding a part of the configuration of one embodiment to the configuration of another embodiment.

LIST OF REFERENCE SIGNS

1, 12: Spin cell
2, 23, 23-1 to 23-n: Semiconductor integrated circuit apparatus
3: Interaction
4, 1800: Memory circuit
5: Selection switch
6: AND circuit
7: OR circuit
8: Adjusting circuit
9: Memory cell
10: Computing circuit
13-1 to 13-4: Word line drive circuit
14: Column circuit
15, 21: Control circuit
22A, 220: Allocation register
100: Ising calculator
1400: Control device
1401: Modified data
1402-1 to 1402-4: Selection line
1403: Address signal
1404: Control signal
1405: Read-out data, written-in data
LG: Inversion logic circuit
WL: Word line
BL1 to BL4: Complementary data line pair
BLT, BLB: Complementary data line
EORU, EORL, EORR, EORD: Exclusive logical sum
ISU, IUU, ILU, IRU, IDU: Unit exclusive logic circuit
ISBU, IUBU, ILBU, IRBU, IDBU: Unit exclusive logic circuit
SWS, SWU, SWL, SWR, SWD: Switch

The invention claimed is:

1. A semiconductor integrated circuit apparatus used for obtaining a solution using an Ising model, the semiconductor integrated circuit apparatus comprising:
a plurality of spin cells that are connected with each other and each of which includes:
a memory cell for memorizing a spin value;
a computing circuit for computing interactions between the plurality of spin cells that are connected with each other;
a memory circuit for holding at least one-bit data; and
a modification circuit capable of modifying a computed result obtained by the computing circuit in accordance with data held by the memory circuit,
wherein the computed result modified by the modification circuit in accordance with the data held by the memory circuit is memorized in the memory cell.

2. The semiconductor integrated circuit apparatus according to claim 1,
wherein the respective memory circuits included in the plurality of spin cells are connected in series and form a shift register.

3. The semiconductor integrated circuit apparatus according to claim 2, the semiconductor integrated circuit apparatus comprising a first adjusting circuit that, in each of the memory circuits which form the shift register and are included in the plurality of spin cells, is capable of executing logical computing using data held by a first memory circuit and data held by a second memory circuit that is different from the first memory circuit, and storing the result of the logical computing in a third memory circuit that is different from the first memory circuit or the second memory circuit,
wherein the occurrence ratio of a specific logical value included in a bit sequence held by the shift register is adjusted by storing the result of the logical computing in the third memory circuit.

4. The semiconductor integrated circuit apparatus according to claim 3,
wherein the specified logical value is a binary signal "1" or a binary signal "0", and the adjustment of the occurrence ratio of the specified logical value means modifying the occurrence ratio of the binary signal "1" or the occurrence ratio of the binary signal "0".

5. The semiconductor integrated circuit apparatus according to claim 4,
wherein the second memory circuit is a memory circuit adjacent to the first memory circuit in the shift register, and the third memory circuit is a memory circuit adjacent to the second memory circuit in the shift register, and
the logical computing executed by the first adjusting circuit is logical computing in which the logical product of the data stored in the first memory circuit and the data stored in the second memory circuit is obtained.

6. The semiconductor integrated circuit apparatus according to claim 4,
- wherein the second memory circuit is a memory circuit adjacent to the first memory circuit in the shift register, and the third memory circuit is a memory circuit adjacent to the second memory circuit in the shift register, and
- the logical computing executed by the first adjusting circuit is logical computing in which the logical sum of the data stored in the first memory circuit and the data stored in the second memory circuit is obtained.

7. The semiconductor integrated circuit apparatus according to claim 4,
- wherein the first adjusting circuit has a first mode in which the result of the logical computing is transferred to the third memory circuit, and a second mode in which the data of the second memory circuit is transferred to the third memory circuit, and
- the first mode or the second mode is selected by a first control signal.

8. The semiconductor integrated circuit apparatus according to claim 4, the semiconductor integrated circuit apparatus further comprising a second adjusting circuit that, in each of the memory circuits which form the shift register and are included in each of the plurality of spin cells, is capable of executing logical computing using data held by a fourth memory circuit and data held by a fifth memory circuit that is different from the fourth memory circuit, and storing the result of the logical computing in a sixth memory circuit that is different from the fourth memory circuit or the fifth memory circuit,
- wherein each of the first adjusting circuit and the second adjusting circuit has a first mode in which the result of the logical computing is transferred to the third memory circuit and to the sixth memory circuit, and a second mode in which the data of the second memory circuit and the data of the fifth memory circuit are transferred to the third memory circuit and the sixth memory circuit, and
- the first mode or the second mode is selected by a first control signal in the first adjusting circuit, and the first mode or the second mode is selected by a second control signal that is different from the first control signal in the second adjusting circuit.

9. The semiconductor integrated circuit apparatus according to claim 8,
- wherein each of the memory cells included in the plurality of spin cells includes a plurality of write paths used for storing data.

10. The semiconductor integrated circuit apparatus according to claim 1,
- wherein the computing circuit calculates the exclusive logical sum of the value of a memory cell included in each of a plurality of adjacent spin cells and an interaction coefficient corresponding to each of the plurality of adjacent spin cells, and outputs a logical value corresponding to the number of specified logical values in the calculated exclusive logical sums as the computed result of the computing circuit.

11. The semiconductor integrated circuit apparatus according to claim 10,
- wherein the exclusive logical sum of the value of the memory cell and the corresponding interaction coefficient is represented by complementary currents in the computing circuit, and
- the exclusive logical sums given by the values of the respective memory cells and the corresponding interaction coefficients are supplied to a pair of common lines in parallel as complementary currents, and a logical value corresponding to the number of specified logical values in the exclusive logical sums is output by comparing a voltage difference between the pair of common lines as the computed result.

12. The semiconductor integrated circuit apparatus according to claim 1,
- wherein the modification circuit is an inversion logic circuit that inverts the computed result of the computing circuit.

13. The semiconductor integrated circuit apparatus according to claim 3, comprising a plurality of initial-value memory circuits that correspond to the respective memory circuits of the plurality of spin cells,
- wherein data stored in the plurality of initial-value memory circuits are transferred to the memory circuits of the corresponding spin cells as initial values respectively.

14. The semiconductor integrated circuit apparatus according to claim 13,
- wherein the plurality of the initial-value memory circuits are connected in series to form an initial-value shift register, and initial values to be set for the respective memory circuits of the plurality of spin cells are sequentially shifted through the initial-value shift register and stored in the initial-value shift register.

* * * * *